(12) United States Patent
Joo et al.

(10) Patent No.: US 10,444,503 B2
(45) Date of Patent: Oct. 15, 2019

(54) METHOD OF CONTROLLING SCREEN AND ELECTRONIC DEVICE FOR PROCESSING SAME

(71) Applicant: Samsung Electronics Co., Ltd., Suwon-si, Gyeonggi-do (KR)

(72) Inventors: Jae-Seok Joo, Seongnam-si (KR); Chang-Ryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 515 days.

(21) Appl. No.: 14/943,338

(22) Filed: Nov. 17, 2015

(65) Prior Publication Data

US 2016/0139787 A1 May 19, 2016

(30) Foreign Application Priority Data

Nov. 18, 2014 (KR) .................. 10-2014-0160930

(51) Int. Cl.
*G06F 3/048* (2013.01)
*G02B 27/01* (2006.01)
(Continued)

(52) U.S. Cl.
CPC .......... *G02B 27/017* (2013.01); *G02B 23/00* (2013.01); *G06F 1/163* (2013.01); *G06F 1/1637* (2013.01); *G06F 3/013* (2013.01); *G06F 3/017* (2013.01); *G06F 3/048* (2013.01); *G06F 3/0488* (2013.01); *G06F 3/1423* (2013.01); *G09G 5/14* (2013.01); *H04N 21/4122* (2013.01); *H04N 21/41407* (2013.01); *H04N 21/4402* (2013.01); *G02B 2027/0178* (2013.01);
(Continued)

(58) Field of Classification Search
None
See application file for complete search history.

(56) References Cited

U.S. PATENT DOCUMENTS

2008/0276178 A1* 11/2008 Fadell .................. G02B 27/017
715/733
2009/0327871 A1* 12/2009 Wolf ...................... G09G 5/005
715/243
(Continued)

FOREIGN PATENT DOCUMENTS

| CN | 103379221 A | 10/2013 |
|---|---|---|
| EP | 1 665 730 B1 | 3/2009 |
| WO | 2005/027467 A1 | 3/2005 |

OTHER PUBLICATIONS

Oh-Chul Kwon et al., Convergence of Mobile Devices with External High-Quality UI Devices, Sep. 1, 2011, IEEE, pp. 91-98 (Year: 2011).*

(Continued)

*Primary Examiner* — Tam T Tran
(74) *Attorney, Agent, or Firm* — Jefferson IP Law, LLP

(57) ABSTRACT

An apparatus and method for contents to a display functionally connected to an electronic device are provided. The electronic device can change at least some of attributes (e.g. a location, a brightness, or a size) of the content of the electronic device on the basis of at least one attribute (e.g., an illuminance, a brightness, a size, or a resolution) of the display functionally connected to the electronic device and provide the content to the display functionally connected to the electronic device.

18 Claims, 11 Drawing Sheets

(51) Int. Cl.
  *G06F 1/16* (2006.01)
  *G02B 23/00* (2006.01)
  *G06F 3/0488* (2013.01)
  *G06F 3/14* (2006.01)
  *G06F 3/01* (2006.01)
  *H04N 21/41* (2011.01)
  *H04N 21/414* (2011.01)
  *H04N 21/4402* (2011.01)
  *G09G 5/14* (2006.01)
  *H04M 1/725* (2006.01)

(52) U.S. Cl.
  CPC ... *G09G 2340/0407* (2013.01); *H04M 1/7253* (2013.01); *H04M 1/72527* (2013.01)

(56) References Cited

U.S. PATENT DOCUMENTS

| | | | |
|---|---|---|---|
| 2010/0079356 A1* | 4/2010 | Hoellwarth | G02B 27/017 345/8 |
| 2011/0022719 A1* | 1/2011 | Anderson | H04L 29/06027 709/231 |
| 2012/0274750 A1 | 11/2012 | Strong | |
| 2013/0083025 A1 | 4/2013 | Gibson et al. | |
| 2013/0097556 A1 | 4/2013 | Louch | |
| 2013/0097561 A1 | 4/2013 | Carpenter et al. | |
| 2013/0278484 A1* | 10/2013 | Hwang | G06F 3/1423 345/2.3 |
| 2014/0033131 A1 | 1/2014 | Shaffer et al. | |
| 2014/0098102 A1 | 4/2014 | Raffle et al. | |
| 2014/0320383 A1* | 10/2014 | Goto | G02B 27/017 345/8 |

OTHER PUBLICATIONS

Quang-Dung Vu et al., Adaptive Web page layout for mobile devices, Apr. 1, 2014, IEEE, pp. 263-268 (Year: 2014).*
Chinese Office Action dated Jul. 1, 2019, issued in Chinese Application No. 201510794548.2.
European Office Action dated May 24, 2019, issued in European Application No. 15195001.1.

* cited by examiner

METHOD OF CONTROLLING SCREEN AND ELECTRONIC DEVICE FOR PROCESSING SAME

CROSS-REFERENCE TO RELATED APPLICATION(S)

This application claims the benefit under 35 U.S.C. § 119(a) of a Korean patent application filed on Nov. 18, 2014 in the Korean Intellectual Property Office and assigned Serial number 10-2014-0160930, the entire disclosure of which is hereby incorporated by reference.

TECHNICAL FIELD

The present disclosure relates to a method of controlling a display and an electronic device for processing the method. More particularly, the present disclosure relates to a method and apparatus for providing contents through a display of an electronic device in various layouts.

BACKGROUND

An electronic device may transfer various types of information to a user. In the electronic device, the information may be displayed to a user through a display of an external electronic device that is connected to the electronic device. As types of external electronic devices become more diverse, the electronic device can provide the information to a user in various forms, and accordingly, convenience of a user can be improved. Further, the electronic device can receive various types of user inputs (e.g. a touch, a gesture, etc.).

The electronic device can perform a function/operation corresponding to a user input (execute a specific application when an icon of the specific application exists on a display region corresponding to a user input) or to display (e.g. move, delete, or copy) currently-displayed contents in a different form.

As the electronic device (e.g. a smartphone) improves performance, the electronic device can provide various pieces of information to another external electronic device. For example, the electronic device can display various contents (e.g. a window, a picture, a video, a web page, an image, a message, etc.) using a display (e.g. a touch screen including a touch panel).

As types of external electronic devices connected to the electronic device become more diverse, attributes (e.g. a resolution, a brightness, a size, a type, etc.) of displays of the external electronic devices are changed. Thus, contents may not be effectively provided to a user through the external electronic device. For example, when contents are displayed through a display of an external electronic device, since the display of the external electronic device and the display of the electronic device do not have the same attributes (e.g. a resolution, a brightness, a size, a type, etc.), it may be difficult to display the contents on the display of the external electronic device in substantially the same form as that of the display of the electronic device.

When contents are displayed through an electronic device and an external electronic device, various embodiments of the present disclosure can provide the contents to a user in a state in which attributes (e.g. a form, a shape, a location, etc.) of the contents are changed in accordance with the attributes of the electronic device and the external electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of controlling a display and an electronic device for processing the method.

In accordance with an aspect of the present disclosure, a method of controlling an electronic device according to an embodiment of the present disclosure is provided. The method includes displaying content in a first layout in the electronic device, and outputting the content to a first external electronic device to display the content in a second layout when the electronic device is functionally connected to the first external electronic device.

An electronic device and a method of controlling the same according to various embodiments can display at least some contents of the electronic device in various layouts on the basis of a connection with an external electronic device connected to the electronic device, thereby improving user convenience when providing, to a user, contents of the electronic device through various external electronic devices.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
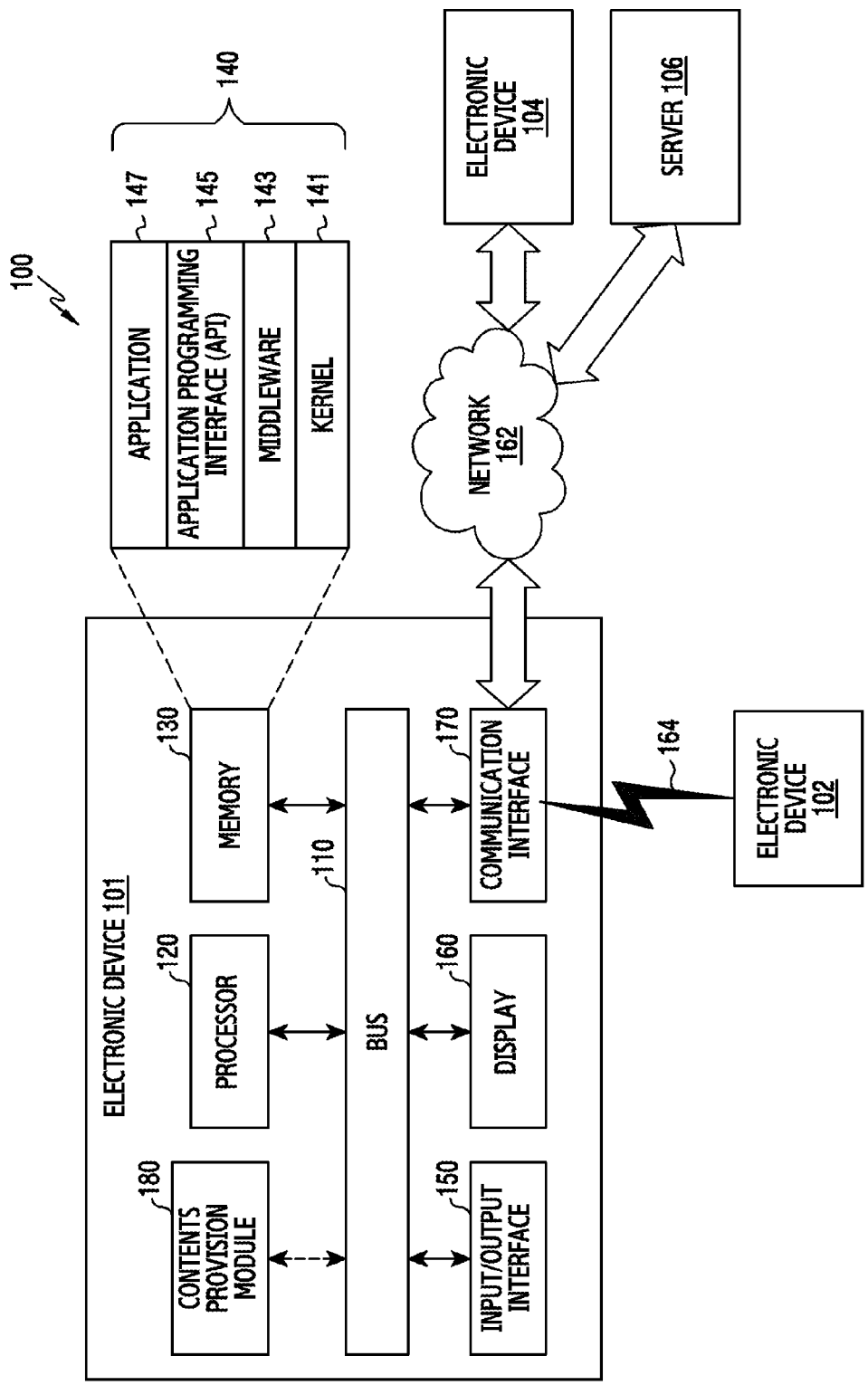
FIG. 1 illustrates a network environment between electronic devices according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features. In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) for performing the corresponding operations or a generic-purpose processor (e.g., central processing unit (CPU) or application processor (AP)) that can perform the corresponding operations by executing one or more software programs stored in a memory device.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a moving picture experts group phase 1 (MPEG-1), audio layer-3 (MP3) player, a mobile medical device, a camera, and a wearable device. According to various embodiments of the present disclosure, the wearable device may include at least one of an accessory type (e.g., a watch, a ring, a bracelet, an anklet, a necklace, a glasses, a contact lens, or a Head-Mounted Device (HMD)), a fabric or integrated clothing type (e.g., an electronic clothing), a body-mounted type (e.g., a skin pad, or tattoo), and a bio-implantable type (e.g., an implantable circuit).

According to some embodiments of the present disclosure, the electronic device may be a home appliance. The home appliance may include at least one of, for example, a television (TV), a digital versatile disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments of the present disclosure will be described with reference to the accompanying drawings. As used herein, the term "user" may indicate a person who uses an electronic device or a device (e.g., an artificial intelligence electronic device) that uses an electronic device.

FIG. 1 illustrates a network environment between electronic devices according to various embodiments of the present disclosure.

Referring to FIG. 1, an electronic device 101 within a network environment 100 according to various embodiments of the present disclosure will be described. The electronic apparatus 101 may include a bus 110, a processor 120, a memory 130, an input/output interface 150, a display 160, a communication interface 170, and a contents provision module 180. In some embodiments of the present disclosure, the electronic device 101 may omit at least one of the above components or may further include other components.

The bus 110 may include, for example, a circuit which interconnects the elements 120 to 180 and delivers a communication (e.g. a control message and/or data) between the components 120 to 180.

The processor 120 may include one or more of a CPU, an AP, and a communication processor (CP). The processor 120, for example, may perform calculation or data processing relating to control and/or communication of at least one other element of the electronic device 101.

The memory 130 may include a volatile memory and/or a non-volatile memory. The memory 130 may store, for example, an instruction or data relevant to at least one other element of the electronic device 101. According to an embodiment of the present disclosure, the memory 130 may store a program (e.g., software) 140. The program 140 may include, for example, a kernel 141, middleware 143, an application programming interface (API) 145, and/or an application (or "application program") 147. At least some of the kernel 141, the middleware 143, and the API 145 may be referred to as an operating system (OS).

The kernel 141 may control or manage system resources (e.g., the bus 110, the processor 120, the memory 130, etc.) used for executing an operation or function implemented by the other programs (e.g., the middleware 143, the API 145, or the application 147). Further, the kernel 141 may provide an interface through which the middleware 143, the API 145, or the application 147 may access the individual components of the electronic device 101 to control or manage the system resources.

The middleware 143, for example, may function as an intermediary for allowing the API 145 or the application 147 to communicate with the kernel 141 to exchange data.

In addition, the middleware 143 may process one or more task requests received from the applications 147 according to priorities thereof. For example, the middleware 143 may assign priorities for using the system resources (e.g., the bus 110, the processor 120, the memory 130, or the like) of the electronic device 101, to at least one of the applications 147. For example, the middleware 143 may perform scheduling or loading balancing for the one or more task requests by processing the one or more task requests according to the priorities assigned thereto.

The API 145 is an interface through which the application 147 controls a function provided from the kernel 141 or the middleware 143, and may include, for example, at least one interface or function (e.g., instruction) for file control, window control, image processing, text control, or the like.

The input/output interface 150, for example, may function as an interface that may transfer instructions or data input from a user or another external device to the other element(s) of the electronic device 101. Further, the input/output interface 150 may output the instruction or data received from the other element(s) of the electronic device 101 to a user or another external device.

The display 160 may include, for example, a liquid crystal display (LCD), a light emitting diode (LED) display, an organic LED (OLED) display, a micro electro mechanical system (MEMS) display, or an electronic paper display. The display 160, for example, may display various types of contents (e.g., a text, an image, a video, an icon, or a symbol) for the user. The display 160 may include a touch screen, and may receive, for example, a touch input, a gesture input, a proximity input, or a hovering input provided by an electronic pen or a body part of a user.

The communication interface 170, for example, may configure communication between the electronic device 101 and an external electronic device (e.g., a first external electronic device 102, a second external electronic device 104, or a server 106). For example, the communication interface 170 can be connected to a network 162 through wireless communication or wired communication so as to communicate with the external electronic device (e.g., the first external electronic device 102, the second external electronic device 104, or the server 106).

According to an embodiment of the present disclosure, the electronic device 101 can be connected to the first external electronic device 102 and the second external electronic device 104 without using a separate communication interface. For example, the electronic device 101 can detect whether at least one electronic device (i.e., the first external electronic device 102 and/or the second external electronic device 104) is in contact with the electronic device 101 or whether at least one electronic device is mounted to the electronic device 101 through at least a part of the electronic device 104, using at least one sensor (e.g., a magnetic sensor, a contact sensor, an optical sensor, etc.) of the electronic device 101.

The wireless communication may use a cellular communication protocol such as, for example, long term evolution (LTE), LTE-Advance (LTE-A), code division multiple access (CDMA), wideband CDMA (WCDMA), universal mobile telecommunications system (UMTS), wireless broadband (WiBro), and global system for mobile communications (GSM). In addition, the wireless communication may include, for example, a short range communication link 164. The short-range communication link 164 may include at least one of, for example, wireless fidelity (Wi-Fi), Bluetooth (BT), near field communication (NFC), and GPS. The wireless communication is not limited to the listed communication schemes and may include any suitable wireless communication schemes. The wired communication may include at least one of, for example, a universal serial bus (USB), a high definition multimedia interface (HDMI), recommended standard 232 (RS-232), and a plain old telephone service (POTS). A network 162 may include at least one of a communication network such as a computer network (e.g., a local area network (LAN) or a wide area network (WAN)), the Internet, and a telephone network.

The first and second electronic devices may be identical to or different from the electronic device 101. According to an embodiment of the present disclosure, the first and second external electronic devices may include, for example, a plurality of electronic devices. According to an embodiment of the present disclosure, the server 106 may include one or more servers. According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 should perform some functions or services automatically or in response to a request, the electronic device 101 may request performing at least some functions to another device (e.g., the electronic device 102 or 104 or the server 106) instead of performing the functions or services. The other electronic device (e.g., the electronic device 102 or 104 or the server 106) may execute the requested functions or the additional functions and transfer the result thereof to the electronic device 101. The electronic device 101 may process the received result to provide the requested functions or services. To achieve this, for example, cloud computing, distributed computing, or client-server computing technology may be used.

The contents provision module 180 can process at least a part of information acquired from other components (e.g. the processor 120, the memory 130, the input/output interface 150, the display 160, the communication interface 170, etc.), and can provide various contents of other components (e.g. the application 147, the application programming interface 145, etc.) through the processed information. For example, the contents provision module 180 can display various contents (e.g. a picture, an image, and a window) through the display 160 or can provide the various contents to the external electronic device 102 through the communication interface 170. According to an embodiment, when the external electronic device 102 includes a head-mounted display (HMD, the electronic device 101 can provide contents to the external electronic device 102. Although it is illustrated in FIG. 1 that the contents provision module 180 is a component independent from the processor 120 and the memory 130, various embodiments of the present disclosure are not limited thereto. The contents provision module 180 may be implemented while being integrated with the processor 120, and may be stored in the memory 130 in a software form and can be executed by the processor 120. Further, the contents provision module 180 may be implemented while being distributed to the processor 120 and the memory 130.

Figure 2:
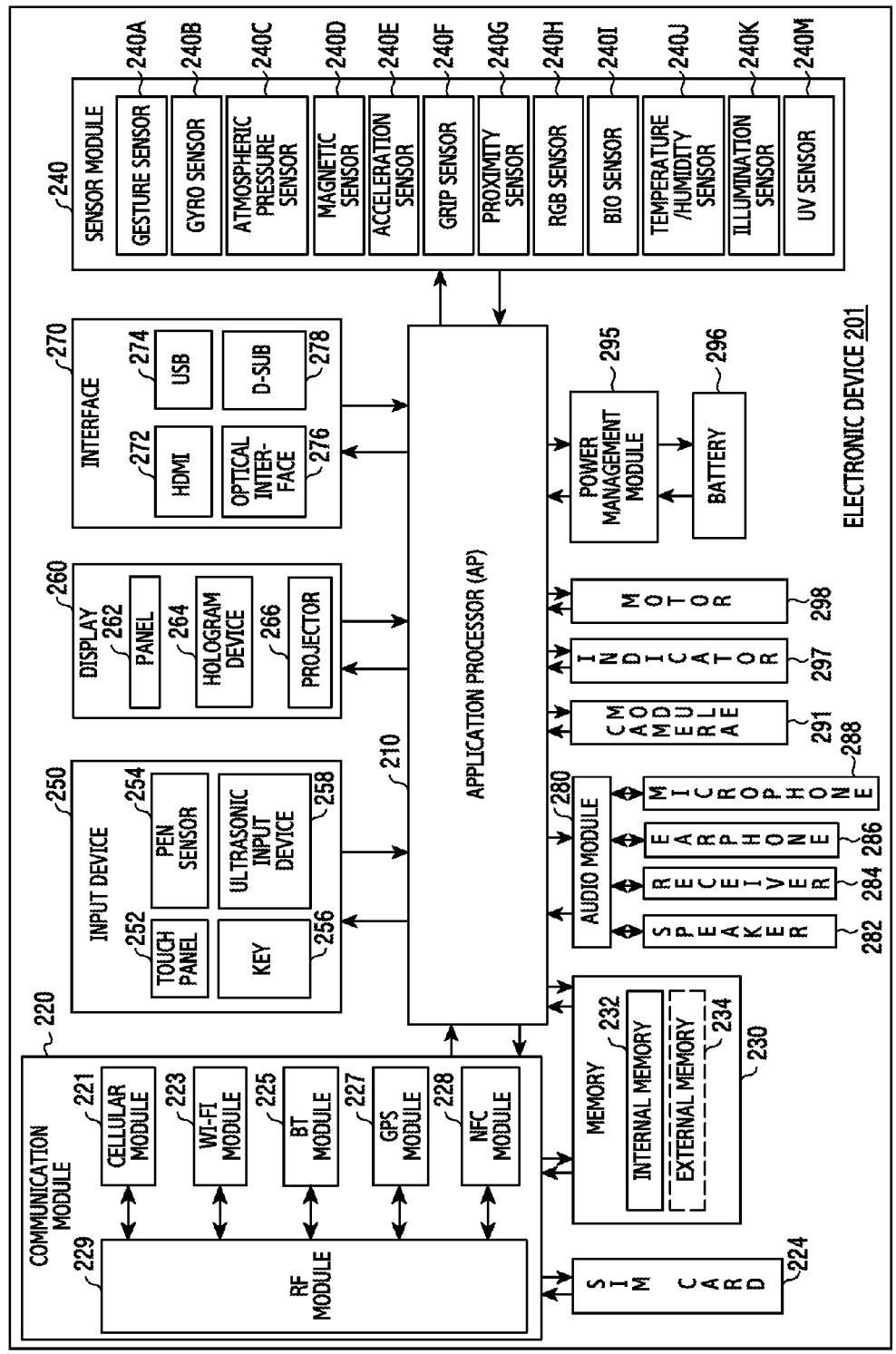
FIG. 2 is a block diagram of an electronic device according to various embodiments of the present disclosure.

FIG. 2 is a block diagram of an electronic device according to various embodiments of the present disclosure.

Referring to FIG. 2, an electronic apparatus 201 may include the entirety or a part of the electronic device 101 illustrated in FIG. 1. The electronic device 201 may include one or more application processors (e.g. APs) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 can control a plurality of hardware or software components connected to the processor 210 by driving an OS or an application, and can perform processing of various pieces of data and calculations. The processor 210 may be implemented by, for example, a system on chip (SoC). According to an embodiment of the present disclosure, the processor 210 may further include a graphic processing unit (GPU) and/or an image signal processor. The processor 210 may include at least some (e.g., a cellular module 221) of the components illustrated in FIG. 2. The processor 210 may load, into a volatile memory, an instruction or data received from at least one of the other elements (e.g., a non-volatile memory) to process the loaded instruction or data, and may store various pieces of data in a non-volatile memory.

The communication module 220 may have a configuration similar to that of the communication interface 170 of FIG. 1. The communication module 220 may include, for example, a cellular module 221, a Wi-Fi module 223, a BT module 225, a GPS module 227, an NFC module 228, and a radio frequency (RF) module 229.

The cellular module 221 may, for example, provide a voice call, an image call, a text message service, or an Internet service through a communication network. According to an embodiment of the present disclosure, the cellular module 221 may authenticate the electronic device 201 within a communication network using a subscriber identification module (for example, the SIM card 224). According to an embodiment of the present disclosure, the cellular module 221 may perform at least some of the functions that the processor 210 can provide. According to an embodiment of the present disclosure, the cellular module 221 may include a CP.

Each of the Wi-Fi module 223, the BT module 225, the GPS module 227, and the NFC module 228 may include, for example, a processor for processing data transmitted and received through the corresponding module. According to any embodiment of the present disclosure, at least some (two or more) of the cellular module 221, the Wi-Fi module 223, the BT module 225, the GPS module 227, and the NFC module 228 may be included in one integrated chip (IC) or IC package.

The RF module 229 may, for example, transmit/receive a communication signal (for example, an RF signal). The RF module 229 may include, for example, a transceiver, a power amplifier module (PAM), a frequency filter, a low noise amplifier (LNA), an antenna, or the like. According to another embodiment of the present disclosure, at least one of the cellular module 221, the Wi-Fi module 223, the BT module 225, the GPS module 227, and the NFC module 228 may transmit/receive an RF signal through a separate RF module.

The subscriber identification module 224 may include, for example, a card including a subscriber identity module and/or an embedded SIM card, and may include identification information (e.g., an integrated circuit card identifier (ICCID)) or subscriber information (e.g., an international mobile subscriber identity (IMSI)).

The memory 230 (for example, the memory 130) may include, for example, an internal memory 232 or an external memory 234. The internal memory 232 may include at least one of, for example, a volatile memory (e.g., a dynamic random access memory (DRAM), a static RAM (SRAM), a synchronous DRAM (SDRAM), and the like) and a nonvolatile memory (for example, an one time programmable read only memory (OTPROM), a programmable ROM (PROM), an erasable and programmable ROM (EPROM), an electrically erasable and programmable ROM (EEPROM), a mask ROM, a flash memory (for example, a NAND flash memory, a NOR flash memory, or the like), a hard drive, or a solid state drive (SSD).

The external memory 234 may further include a flash drive, for example, a compact flash (CF), a secure digital (SD), a micro-SD, a mini-SD, an eXtreme digital (xD), a multimedia card (MMC), a memory stick, or the like. The external memory 234 may be functionally and/or physically connected to the electronic device 201 through various interfaces.

The sensor module 240 may, for example, measure a physical quantity or detect an operation state of the electronic device 201, and may convert the measured or detected information into an electric signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red/green/blue (RGB) sensor), a bio-sensor 240I, a temperature/humidity sensor 240J, an illumination sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments of the present disclosure, the electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an IR type, and an ultrasonic type. Further, the touch panel 252 may further include a control circuit. The touch panel 252 may further include a tactile layer and provide a tactile reaction to a user.

The (digital) pen sensor 254 may include, for example, a recognition sheet that is integral or separate from the touch panel. The key 256 may include, for example, a physical button, an optical key or a keypad. The ultrasonic input device 258 may detect ultrasonic waves generated by an input tool through a microphone (for example, a microphone 288) to identify data corresponding to the detected ultrasonic waves.

The display 260 (for example, the display 160) may include a panel 262, a hologram device 264 or a projector 266. The panel 262 may include a configuration that is identical or similar to the display 160 illustrated in FIG. 1. The panel 262 may be implemented to be, for example, flexible, transparent, or wearable. The panel 262 and the touch panel 252 may be implemented as one module. The hologram device 264 may show a three dimensional image in the air by using an interference of light. The projector 266 may display an image by projecting light onto a screen. The screen may be located, for example, inside or outside the electronic apparatus 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270 may be included in, for example, the communication interface 170 shown in FIG. 1. Additionally or alternatively, the interface 270 may include, for example, a mobile high-definition link (MHL) interface, a SD card/MMC interface, or an IR data association (IrDA) standard interface.

The audio module 280 may bilaterally convert, for example, a sound and an electrical signal. At least some components of the audio module 280 may be included in, for example, the input/output interface 150 illustrated in FIG. 1. The audio module 280 may process sound information which is input or output through, for example, a speaker 282, a receiver 284, an earphone 286, the microphone 288 or the like.

The camera module 291 is capable of capturing a still image and a moving image. According to an embodiment of the present disclosure, the camera module 291 may include one or more image sensors (e.g., a front sensor or a back sensor), a lens, an image signal processor (ISP), and a flash (e.g., an LED, a xenon lamp, or the like).

The power management module 295 may, for example, manage power of the electronic device 201. According to an embodiment of the present disclosure, the power management module 295 may include a power management integrated circuit (PMIC), a charger IC, or a battery or fuel gauge. The PMIC may use a wired and/or wireless charging method. Examples of the wireless charging method may include, for example, a magnetic resonance scheme, a magnetic induction scheme, an electromagnetic wave scheme, and the like. Further, the power management module 295 may further include additional circuits (e.g., a coil loop, a resonance circuit, a rectifier, etc.) for wireless charging. The battery gauge may measure, for example, a residual quantity of the battery 296, and a voltage, a current, or a temperature during the charging. The battery 296 may include, for example, a rechargeable battery and/or a solar battery.

The indicator 297 may display a particular state (e.g., a booting state, a message state, a charging state, or the like) of the electronic apparatus 201 or a part (e.g., the processor 210) of the electronic apparatus 201. The motor 298 can convert an electrical signal into mechanical vibration, and can generate a vibration, a haptic effect, or the like. Although not illustrated, the electronic apparatus 201 may include a processing unit (e.g., a GPU) for supporting a mobile TV. The processing unit for supporting mobile TV may, for example, process media data according to a certain standard such as digital multimedia broadcasting (DMB), digital video broadcasting (DVB), or mediaFLO™.

Each of the above-described component elements of hardware may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments of the present disclosure may be combined into one entity, which may perform functions identical to those of the relevant components before the combination.

Figure 3:
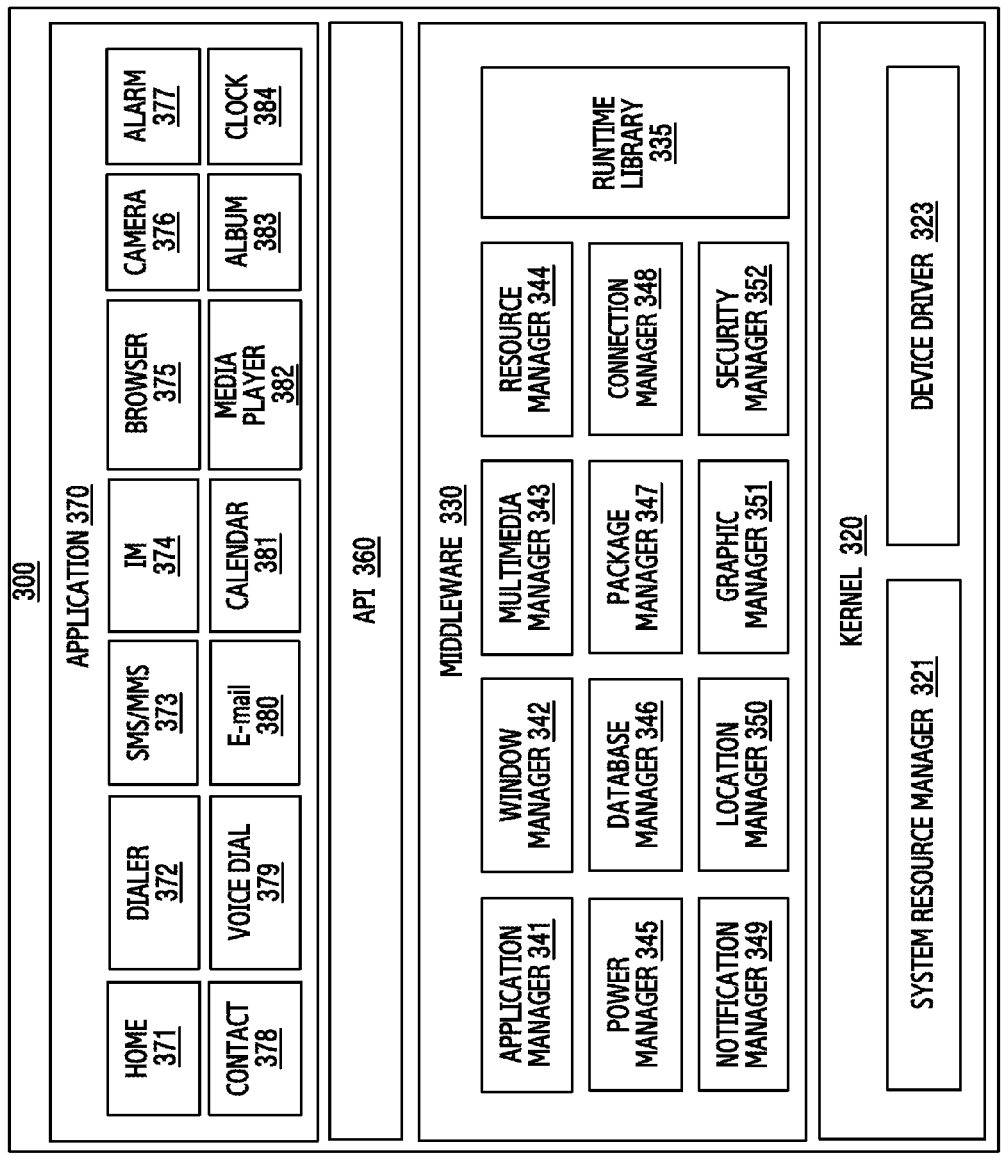
FIG. 3 is a block diagram of a program module according to various embodiments of the present disclosure.

FIG. 3 is a block diagram of a program module according to various embodiments of the present disclosure.

Referring to FIG. 3, the program module 300 (for example, the program 140) may include an OS for controlling resources related to the electronic device (for example, the electronic device 101) and/or various applications (for example, the application 147) executed in the OS. The OS may be, for example, Android, iOS®, Windows®, Symbian®, Tizen®, Bada®, or the like.

The program module 300 may include a kernel 320, middleware 330, an API 360, and/or an application 370. At least some of the program module 300 may be preloaded on the electronic apparatus, or may be downloaded from an external electronic apparatus (e.g., the electronic apparatus 102 or 104, or the server 106).

The kernel 320 (e.g., the kernel 141) may include, for example, a system resource manager 321 and/or a device driver 323. The system resource manager 321 may perform control, allocation, retrieval, or the like of system resources. According to an embodiment of the present disclosure, the system resource manager 321 may include a process management unit, a memory management unit, a file system management unit, or the like. The device driver 323 may include, for example, a display driver, a camera driver, a BT driver, a shared memory driver, a USB driver, a keypad driver, a Wi-Fi driver, an audio driver, or an inter-process communication (IPC) driver.

For example, the middleware 330 may provide a function performed for the application 370, or may provide various functions to the application 370 through the API 360 to enable the applications 370 to efficiently use the system resources within the electronic device. According to an embodiment of the present disclosure, the middleware 330 (e.g., the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a complier to add a new function during the execution of the application 370. The runtime library 335 can perform input/output management, memory management, arithmetic functions, or the like.

The application manager 341 can, for example, manage a life cycle of at least one application among the applications 370. The window manager 342 can manage graphical user interface (GUI) resources used for the screen. The multimedia manager 343 can identify a format required to reproduce various media files, and can encode or decode a media file by using a coder/decoder (CODEC) that is appropriate for the corresponding format. The resource manager 344 can manage resources such as a source code, a memory, a storage space, and the like of at least one application among the applications 370.

The power manager 345 may operate together with a basic input/output system (BIOS) to manage a battery or power and may provide power information required for the operation of the electronic device. The database manager 346 can generate, search for, or change a database to be used by at least one application among the applications 370. The package manager 347 can manage installation or update of an application distributed in a form of a package file.

The connectivity manager 348 can, for example, manage a wireless connection such as Wi-Fi or BT. The notification manager 349 can display or notify of an event such as an arrival message, an appointment, a proximity notification, and the like in such a manner as not to disturb a user. The location manager 350 can manage location information of the electronic device. The graphic manager 351 can manage a graphical effect which is to be provided to a user or a user interface related to the graphic effect. The security manager 352 can provide various security functions required for system security, user authentication, and the like. According to an embodiment of the present disclosure, when the electronic device (e.g., the electronic device 101) includes a telephone call function, the middleware 330 may further include a telephony manager for managing a voice call function or a video call function of the electronic device.

The middleware 330 may include a middleware module which forms a combination of various functions of the above-described components. The middleware 330 can provide a module specialized for each type of OS in order to provide a differentiated function. Further, the middleware 330 may dynamically delete some of the existing components, or may add new components.

The API 360 (e.g., the API 145) is, for example, a set of API programming functions, and may have a different configuration according to an OS. For example, in a case of Android® or iOS®, one API set may be provided for each platform. Further, in a case of Tizen®, two or more API sets may be provided for each platform.

The application 370 (e.g., the application 147) may include, for example, one or more applications which can provide functions such as a home function 371, a dialer 372, an short message service (SMS)/multimedia messaging service (MMS) 373, an instant message (IM) 374, a browser 375, a camera 376, an alarm 377, a contact 378, a voice dialer 379, an email 380, a calendar 381, a media player 382, an album 383, a clock 384, health care (e.g., measurement of exercise quantity or blood sugar), or provision of environment information (e.g., atmospheric pressure, humidity, or temperature information).

According to an embodiment of the present disclosure, the applications 370 may include an application (hereinafter, referred to as an "information exchange application" for convenience of description) for exchanging information between the electronic device (e.g., the electronic device 101) and an external electronic apparatus (e.g., the electronic devices 102 or 104). The information exchange application may include, for example, a notification relay application for transferring specific information to an external electronic device or a device management application for managing an external electronic device.

For example, the notification relay application may deliver, to the external electronic device (e.g., the electronic devices 102 or 104), notification information generated by other applications (e.g., an SMS/MMS application, an email application, a health care application, an environmental information application, etc.) of the electronic apparatus 101. Further, the notification relay application may, for example, receive notification information from an external electronic device to provide the received notification information to a user.

A device management application may, for example, manage (e.g., install, delete, or update) at least one function of the external electronic device (e.g., the electronic devices 102 and 104) communicating with the electronic device (e.g., turning on/off the external electronic device itself (or some elements thereof) or adjusting brightness (or resolution) of a display), applications executed in the external electronic device, or services provided from the external electronic device (e.g., a telephone call service or a message service).

According to an embodiment of the present disclosure, the application 370 may include applications (e.g., a health care application of a mobile medical appliance or the like) designated according to attributes of the external electronic device (e.g., the electronic devices 102 or 104). According to an embodiment of the present disclosure, the application 370 may be received from the external electronic devices (e.g., the server 106, or the electronic devices 102 or 104). According to an embodiment of the present disclosure, the application 370 may be a preloaded application or a third party application which can be downloaded from the server. Names of the components of the program module 300 according to the above-described embodiments of the present disclosure may be changed according to the type of OS.

According to various embodiments of the present disclosure, at least some of the program module 300 may be implemented in software, firmware, hardware, or a combination of two or more thereof. At least some of the program module 300 may be implemented (e.g., executed) by, for example, the processor (e.g., the processor 120). At least some of the program module 300 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application specific integrated circuit (ASIC) chip, a field-programmable gate arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (for example, a magnetic tape), optical media (for example, a compact disc read only Memory (CD-ROM) and a DVD), magneto-optical media (for example, a floptical disk), a hardware device (for example, a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Further, the embodiments of the present disclosure are only for the description and understanding of technical contents and do not limit the scope of the present disclosure. Accordingly, the scope of the present disclosure should be construed as including all modifications or various other embodiments of the present disclosure based on the technical idea of the present disclosure.

Figure 4:
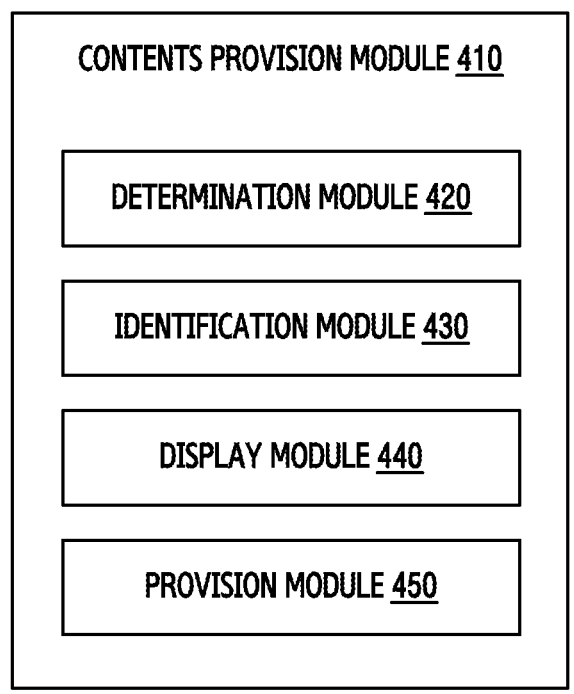
FIG. 4 is a block diagram of a contents provision module according to various embodiments of the present disclosure.

FIG. 4 is a block diagram of a contents provision module (e.g. the contents provision module 180) of an electronic device according to various embodiments of the present disclosure.

Referring to FIG. 4, a contents provision module 410 may include, for example, a determination module 420, an identification module 430, a display module 440, and a provision module 450. According to an embodiment of the present disclosure, contents may be information or an object, which may be displayed through a display functionally connected to the electronic device. For example, the contents may be one of an application, a window, a picture, a video, a web page, and a document, which are executed in the electronic device. The contents are not limited to the listed kinds, and may include, for example, an application displayed in a predetermined size in the electronic device.

The determination module 420 can determine, for example, a layout related to a display of the contents. According to an embodiment of the present disclosure, the determination module 420 can display at least a part of the contents in a different size, a different shape, or a different arrangement according to a (given) layout. For example, when a shape of an outer line constituting the contents is changed to a triangle, a shape of a layout of the contents is changed to a triangle. For example, the layout may indicate a shape of the contents. According to an embodiment, when a plurality of contents are arranged in a circular shape, the contents are arranged in a layout having a circular shape. The determination module 420 can determine (or change) attributes (e.g. a size, a location, a resolution, a color, or a shape) of a layout of at least one content. According to an embodiment of the present disclosure, the determination module 420 can determine a shape of a layout on the basis of information of the electronic device (e.g., the electronic device 101), device information of an external electronic device (e.g., the electronic device 102 and the electronic device 104) functionally connected to the electronic device (e.g. the electronic device 101), a user's bio information, and a user's input. A connection between the electronic device and the external electronic device may include at least one connection among a wired connection (e.g., USB, HDMI, or the like) or a wireless connection (e.g., Wi-Fi, NFC, BT, or the like).

According to an embodiment of the present disclosure, device information of the electronic device or the external electronic device may include, for example, a size, a resolution, and radial information (e.g., a curvature) of a curved display. The radial information may include, for example, at least one of information on a physical bent degree of a display panel and information on a visual bent degree of a screen displayed by a display. According to an embodiment of the present disclosure, the user's bio information may include, for example, at least one of a predetermined area (e.g., a viewing angle) which can be visually recognized by the user, and a gaze direction, a movement, a gesture, a voice, and eyesight information of the user. For example, the determination module 420 can enlarge the size of the contents in a ratio corresponding to eyesight of a user when the eyesight of the user is lower than a predetermined reference.

According to an embodiment of the present disclosure, the determination module 420 can change a form of a layout on the basis of the device information of the electronic device or the external electronic device. For example, the determination module 420 can change a form (e.g., rotation, a slope, a size, bending, etc.) of contents in proportion to a bent angle based on the bent degree (e.g., a curvature) of the display. For example, the determination module 420 can acquire the information on the bent degree (e.g., a curvature) of the display, and change the attributes (e.g., a slope, rotation, and a size) of the contents in accordance with a curvature value of a display has a larger curvature than a predetermined curvature value (e.g., about 4200R (a bent degree corresponding to a circle having a radius of 4200 mm)) For example, as the curvature value is larger, the contents may be displayed to be more bent. According to an embodiment of the present disclosure, the determination module 420 can change and display contents in accordance with a viewing area (not illustrated) where a user can view the display, on the basis of the viewing angle (e.g., an area which can be visually identified by a user in the display) of the display. For example, when the viewing angle of the display is about 140 degrees, the determination module 420 can enlarge or reduce the size of the contents in accordance with the viewing angle of 140 degrees.

According to an embodiment of the present disclosure, the determination module 420 can provide the contents to a user through the electronic device directly or through the external electronic device by changing the attributes (e.g., a location, a form, a color, and a size) of at least one layout. According to an embodiment of the present disclosure, when the contents correspond to a window, a form of a layout may be a form in which one window is displayed or may be a form in which at least some parts of at least one window overlap each other. For example, in a case of a first layout, the electronic device can display a window in a form in which at least some parts of at least one window are located to overlap each other. Otherwise, the electronic device can move at least one window or display a window in a second layout in which the at least one window is displayed while the size of the at least one window is enlarged or reduced, such that the at least one window do not overlap each other.

According to an embodiment of the present disclosure, the first layout having a circular shape may include at least one content displayed in a circular shape. The second layout having a quadrangle shape may include at least one content displayed in a quadrangle shape. For example, when a plurality of contents are arranged in a circular shape, a layout of the contents may be a circular layout. According to an embodiment of the present disclosure, a form (e.g., a circular shape, a spiral shape, a semi-circular shape, a quadrangular shape) of a layout may be changed according to an arrangement (e.g., a location) of contents (e.g., an image, a window, or an application).

According to an embodiment of the present disclosure, the electronic device can change an attribute (e.g., a size, a location, a ratio, etc.) of a layout of at least one content among a plurality of contents (e.g., a multi-window) and provide the changed attribute to the external electronic device that is functionally connected to the electronic device or a user. According to an embodiment of the present disclosure, the electronic device can provide information (e.g., a size, a color, and a location of a multi-window, or activation information of each window) on the layout to the external electronic device to display a form of a layout in an external electronic device. Additional information on the layout will be provided with reference to FIG. 5B.

The identification module 430 can identify information on a connection between the electronic device (e.g., the electronic device 101) and the external electronic devices (e.g., the electronic devices 102 and 104) or a user. According to an embodiment of the present disclosure, the identification module 430 can identify whether the electronic device is connected to the external electronic device through wireless communication (e.g., cellular communication, Wi-Fi, BT, NFC, or the like) or wired communication (e.g., USB, HDMI, or the like), device information on a connectable external electronic device (e.g., an IP address, a media access control (MAC) address, an identifier, etc. of an external electronic device), or connection state information (e.g., a transmission speed, etc.). For example, the identification can include an operation of detecting, identifying, or sensing a connection between the electronic device (e.g., the electronic device 101) and the external electronic devices (e.g., the electronic devices 102 and 104).

According to an embodiment of the present disclosure, when the electronic device and the external electronic device are not connected to each other, a connection can be established as the electronic device comes into contact with a part of the external electronic device. For example, the electronic device and the external electronic device can be connected to each other via a docking structure. For example, in the docking structure, a part of the electronic device and a part of the external electronic device are coupled to each other. For example, the electronic device may be mounted to the interior of the external electronic device or may be functionally connected to the external electronic device.

According to an embodiment of the present disclosure, the identification module 430 can identify an external electronic device connectable to the electronic device or identify whether the electronic device is connected to the external electronic device, through at least one sensor (e.g., a touch sensor, a camera sensor, an IR sensor, an electromagnetic sensor, a magnetic field sensor, a contact detection sensor, a proximity sensor, or a magnetic sensor). For example, when an external electronic device including a magnet is coupled or fastened (e.g., docked) to the electronic device, the electronic device can identify whether the external electronic device approaches the electronic device or whether the electronic device and the external electronic device are connected to each other, through a magnetic force detection sensor (e.g., a hall sensor, a magnetic reed switch, etc.).

According to an embodiment of the present disclosure, the magnetic force detection may be located in at least a part of the electronic device or in at least a part of the external electronic device, and the electronic device can detect a distance from the external electronic device on the basis of information sensed by the magnetic force detection sensor. For example, the intensity of a magnetic force can be increased in reverse proportion to the distance between the electronic device and the external electronic device. For example, when the intensity of the magnetic force is larger than a predetermined reference intensity, the electronic device can identify a connection with the external electronic device.

According to an embodiment of the present disclosure, the identification module 430 can determine whether at least one device among the electronic device and the external electronic device is attached to or worn on at least a part of a body of a user. The identification module 430 can perform the determination on the basis of information sensed by a sensor functionally connected to at least one device. For example, when a user wears an HMD, the identification module 430 can determine whether the HMD is being worn by receiving, from the HMD, specific information (e.g., temperature, face recognition, a fingerprint, etc.) detected by a bio information detection sensor.

The display module 440 can, for example, display at least one content on a display of the electronic device.

According to an embodiment of the present disclosure, the display module 440 can, for example, control the display to display contents on the basis of at least one of the display of the electronic device and a display functionally connected to the external electronic device.

According to an embodiment of the present disclosure, the display module 440 can simultaneously display contents on the electronic device or can sequentially display contents on the basis of device attribute information of the electronic device. The attribute information may include, for example, battery information (e.g., a residual battery capacity), activation of the electronic device (e.g., an ON state, an OFF state, a sleep state, and a deep sleep state), and grasping information of the electronic device by a user (e.g., a location of a display grasped by a user's hand). For example, when a battery residual capacity of the electronic device is lower than a predetermined reference (e.g., equal to lower than 30% of a power capacity of a battery), the display module 440 can terminate displaying contents in the electronic device and display the contents in the external electronic device. According to an embodiment of the present disclosure, the display module 440 can change a size, a shape, a color, a location or the like of content on the basis of an attribute (e.g., a type, a resolution, a size, a brightness, etc. of a display) of a display functionally connected to at least one device and display the content of which the size, the shape, the color, the location, or the like is changed. According to an embodiment of the present disclosure, when the electronic device is connected to the plurality of external electronic devices, the display module 440 can display contents received through the plurality of external electronic device, through the electronic device. For example, when the electronic device is simultaneously connected to a TV, an HMD, and a tablet PC, the electronic device can receive, from the at least one device, information on contents or a layout displayed through the at least one device and display the contents in accordance with the received information.

According to an embodiment of the present disclosure, the electronic device can simultaneously or sequentially display at least some contents among a plurality of contents received from a plurality of external electronic devices on the basis of an attribute (e.g., a resolution, a type, a size, a curvature of a display, etc.) of the electronic device. For example, the display module 440 can display first contents received from a first external electronic device on a first area of the display of the electronic device and display second contents received from a second external electronic device on a second area of the display, simultaneously, sequentially, or in a different order.

For example, the electronic device can sequentially display a plurality of contents received from a plurality of external electronic devices on the basis of an order in which the electronic device is connected to the plurality of external electronic devices.

According to an embodiment of the present disclosure, the display module 440 can display contents in a layout determined by the determination module 420.

According to an embodiment of the present disclosure, the display module 440 can display contents in a first layout on the display functionally connected to the electronic device while the contents are displayed in a second layout in the external electronic device.

The provision module 450 can provide at least one piece of information on a layout (e.g., contents or information relating to the contents) to the external electronic device or a user. For example, the provision module 450 can provide information (a size, an activation state, and a type of contents included in a layout, and a size, a form, a shape, etc. of the layout) of at least one layout (e.g., the first layout and the second layout) to the external electronic device.

According to an embodiment of the present disclosure, when the external electronic device is an electronic device (e.g., an HMD) which cannot perform image processing (e.g., changing a layout of contents from the first layout to the second layout), the provision module 450 can provide the second layout to the display of the external electronic device. The external electronic device can provide contents provided from the provision module 450 to a user through the display of the external electronic device without separate image processing (e.g., changing a layout from the first layout to the second layout). For example, when the electronic device is mounted to the external electronic device, the electronic device can display contents of the second layout through the display functionally connected to the electronic device, and the external electronic device can provide the contents of the second layout to a user through a lens (e.g., reference numeral 555 of FIG. 5B) of the external electronic device.

According to an embodiment of the present disclosure, when the external electronic device is an electronic device (e.g., an HMD) which can perform the image processing (e.g., changing a layout of contents from the first layout to the second layer), the provision module 450 can provide contents of the first layout or at least one piece of information (e.g., a size, a color, a location, and an activation state of the contents) relating to the contents of the first layout, to the external electronic device, on the basis of wired or wireless communication.

According to an embodiment of the present disclosure, the activation state of the contents may include a state in which the contents are focused. The electronic device can distinguishably display focused contents and not-focused contents. For example, the electronic device can process an attribute (e.g., a brightness, a color, a thickness of an outer line, and a transparency) of the focused contents different from that of the not-focused contents. According to an embodiment of the present disclosure, the activation may include an operation of selecting at least one content among a plurality of contents. For example, the electronic device can determine a content selected (e.g., touched) by a user as an activated content.

According to an embodiment of the present disclosure, the external electronic device change an attribute (e.g., a size, a color, a location, etc.) of contents having a first layout form on the basis of at least one of the contents having the first layout form and information on a first layout (e.g., activated contents, a size and a color of contents, etc.), and display contents having a second layout form through the display. For example, the external electronic device can display a window, of which a layout is changed to the second layout form, through the display on the basis of information on window information (e.g., a location, a size, etc. of an activated window) provided from the electronic device. At this time, the electronic device can display at least one window among the windows on the basis of the information by activating the window.

Figure 5A:
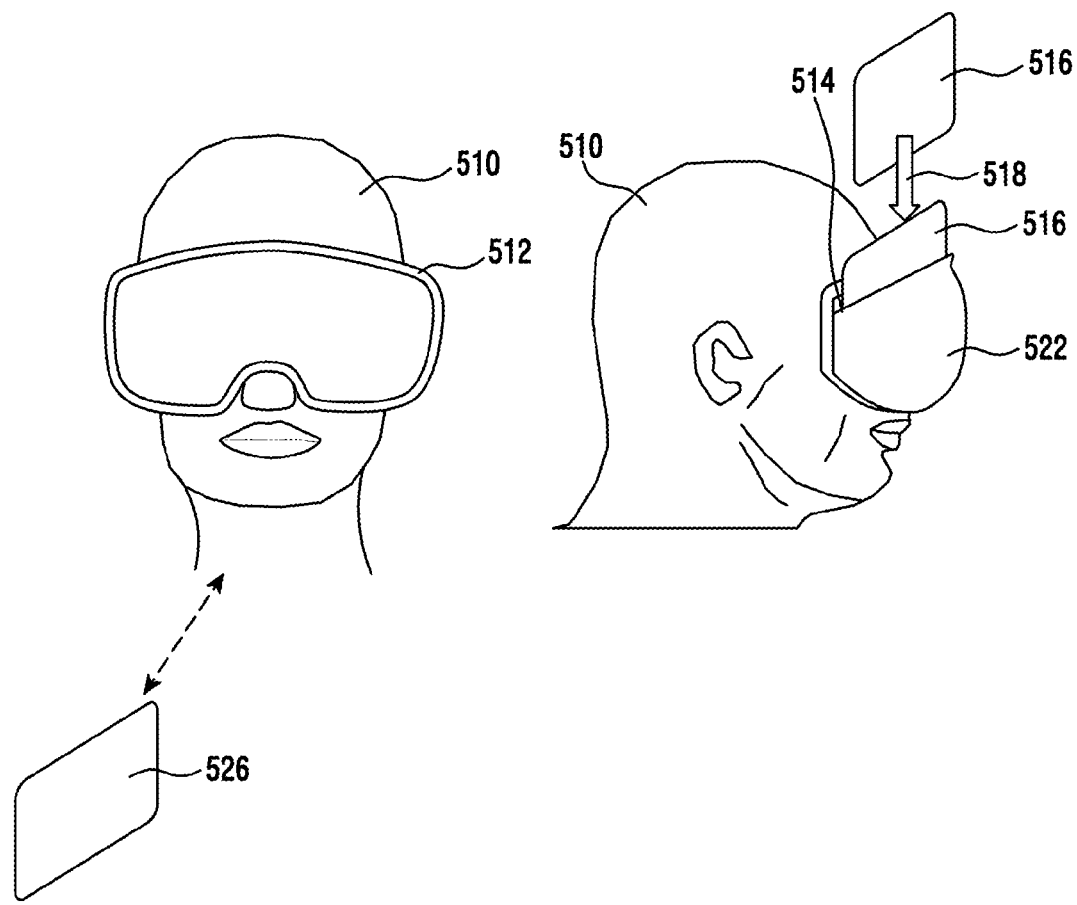
FIG. 5A illustrates a connection between an electronic device and an external electronic device according to various embodiments of the present disclosure.

FIG. 5A illustrates a connection between an electronic device and an external electronic device according to various embodiments of the present disclosure.

Referring to FIG. 5A, an electronic device 512 may be an HMD and can be attached to or worn on a user's head 510. An HMD may include the electronic device 512 which can wiredly or wireless connected to the external electronic device 526. An electronic device 522 may be an HMD which can connect to an external electronic device 516 via a fastener (i.e., docking structure).

According to an embodiment of the present disclosure, the electronic device 512 may be an HMD which can provide a virtual image to the user through a display of the electronic device 512 while being worn on the user's head 510.

According to an embodiment of the present disclosure, the electronic device can transmit/receive information (e.g., contents) on the basis of a mechanical connection (e.g., a docking connection) with an external electronic device or a communication connection (e.g., a wired connection and a wireless connection). According to an embodiment of the present disclosure, the external electronic device may be a wearable device which is identical to or different from the electronic device. The external electronic device may include, for example, at least one of a smartphone, a tablet PC, a mobile phone, a desktop, and a TV.

According to an embodiment of the present disclosure, the electronic device 512 may not include a dedicated processor (e.g., a GPU) formed therein for image processing. In this case, the electronic device 512 can receive contents (e.g., an image) from the external electronic device 526 and provide the contents to a user without separate image processing.

According to an embodiment of the present disclosure, the electronic device 512 may have the dedicated processor (e.g., a GPU) formed therein for image processing separately from a general purpose processor (e.g., a CPU), or may have a form in which the dedicated processor and the general purpose processor are integrated (e.g., configured into the same integrated circuit package). In this case, the electronic device 512 can receive contents (e.g., an image) from the external electronic device 526, perform image processing (e.g., changing a layout of the contents), and then provide the contents to a user. For example, the electronic device 512 can change an attribute (e.g., a size, a resolution and an arrangement) of contents through the dedicated processor for image processing.

According to an embodiment of the present disclosure, the electronic device 522 can be mechanically connected to the external electronic device 516. For example, the electronic device 522 may include a fastener structure 514 (e.g., a docking structure). For example, when the external electronic device 516 moves in a downward direction 518, the electronic device 522 can be mechanically connected (e.g., docked) to the external electronic device 516 through a fastener structure 514 of the electronic device 522.

According to an embodiment of the present disclosure, the electronic device 512 can be connected to the external electronic device 526 on the basis of at least one communication among wireless communication (e.g., Wi-Fi, LTE, etc.) and wired communication (e.g., USB). For example, the electronic device can receive contents or information relating to the contents through at least one communication among the wireless communication and the wired communication with the external electronic device 526. The electronic device 512 can provide (e.g., display) the received contents to the user 510. For example, the electronic device 512 can receive information of contents displayed in a first layout. The electronic device 512 can change the received contents to a second layout form on the basis of at least one of a device attribute (e.g., a size, a curvature, etc. of a display) of the electronic device 512 or bio information (e.g., a viewing angle, a sight, an age, etc.) of the user 510 and can provide, to the external electronic device, at least one of the contents of which the layout is changed to the second layout or information of the second layout. According to an embodiment of the present disclosure, the provision may include an operation of transmitting the information through wireless communication or wired communication and an operation of displaying contents of the electronic device through a lens of the external electronic device such that a user can view the contents.

According to an embodiment of the present disclosure, the electronic device 512 can, for example, provide contents to the external electronic device 526, and the corresponding contents can be displayed through the external electronic device 526.

The electronic device 512 can, for example, provide at least one of information on a layout (e.g., the first layout) for displaying contents in the electronic device 512 and information on a layout (e.g., the second layout) for displaying contents of the electronic device 512 in the external electronic device 526. The electronic device 512 can, for example, generate information on the second layout for displaying contents of the electronic device 512 in the external electronic device 526 on the basis of an attribute (e.g., a type of a device, a size, a curvature, and a resolution of a display, etc.) of the external electronic device 526. For example, the electronic device 512 can receive information on a type of an external electronic device (e.g., an HMD supporting a resolution of 1600×900) and change the size of contents in accordance with the corresponding external electronic device.

According to an embodiment of the present disclosure, the electronic device 512 can communicate with an HMD (e.g., the electronic device 522) or another external electronic device (e.g., the electronic device 516) mounted to the HMD (e.g., the electronic device 522) while communicating with one external electronic device 526. For example, the electronic device 512 can simultaneously display at least a part of contents in the second layout in the HMD (e.g. the electronic device 522) that is connected to the electronic device 512 while displaying contents in the first layout in the external electronic device 526 that is functionally connected to the electronic device 512.

Figure 5B:
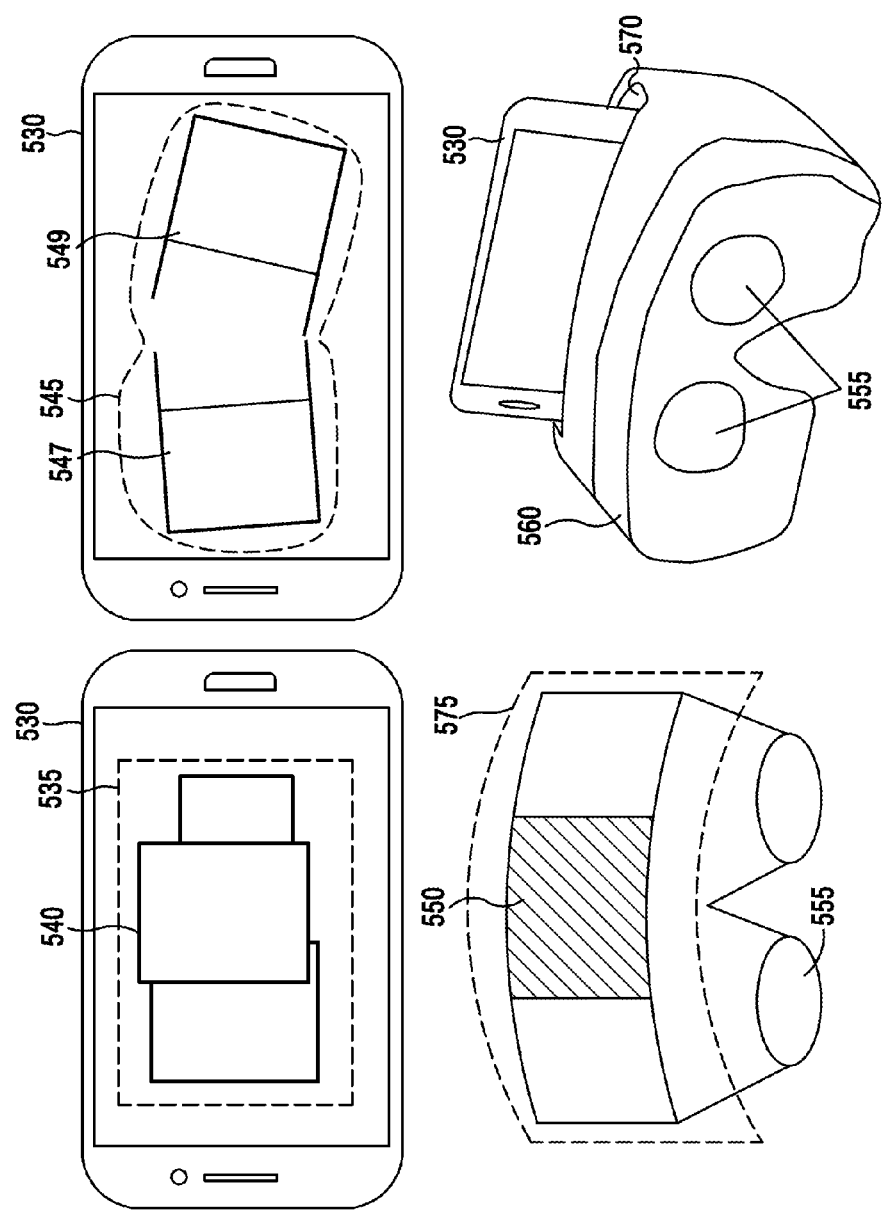
FIG. 5B illustrates an example layout change in an electronic device according to various embodiments of the present disclosure.

FIG. 5B illustrates an example layout change in an external electronic device according to various embodiments.

Referring to FIG. 5B, an electronic device 530 can be mounted (e.g., fastened) via a connection area (e.g., a docking area 570) of an external electronic device 560. According to an embodiment of the present disclosure, the electronic device 530 may be an electronic device (e.g., a portable phone, a tablet PC, a small PC, etc.) which can be coupled (e.g., mounted) to an HMD 560. The external electronic device 560 may be a wearable device which can be mounted to (e.g., worn on) at least a part of a body of a user while being coupled (e.g., mounted) to the electronic device 530.

According to an embodiment of the present disclosure, before the electronic device 530 is coupled (e.g., mounted) to the external electronic device 560, the electronic device 530 may display at least one content 540 in a form of a first layout 535 in which at least some parts overlap each other.

According to an embodiment of the present disclosure, the electronic device 530 can be mechanically connected to the external electronic device 560. For example, the external electronic device 560 may include the docking structure 570 by which the electronic device 530 can be coupled (mounted) to the external electronic device 560. The external electronic device 560 may include lens 555 for providing the contents 540 displayed in the electronic device 530 to a user of the electronic device 522.

According to an embodiment of the present disclosure, when the electronic device 530 is coupled (e.g., mounted) to the external electronic device 560, the electronic device 530 can, for example, detect the coupling and change the contents 540 displayed in a form of a first layout to contents 547 and 549 of a second layout 545. Contents 550 displayed in a size of a display area 575 of the external electronic device 560 can be provided to a user through the lens 555. The electronic device 530 can, for example, change the contents 540 to the second layout 545 to provide at least a part of the contents 540 to a left area 547 through a left lens of the lens 555 of the external electronic device 560 and provide at least a part of the contents 540 to a right area 549 through a right lens of the lens 555.

According to an embodiment of the present disclosure, when a user views at least some parts 547 and 549 of the contents 540 through the lens 555, the user can view the contents 540 in a form in which the left area 547 and the right area 549 of the contents 540 are integrated. At this time, the electronic device can provide, to a user, the contents 540 having a first layout 535, of which some parts are displayed to overlap each other, and contents 550 having a second layout 545, of which some parts are displayed not to overlap each other. For example, the external electronic device 560 can provide, to a user, the contents 550 having the second layout 545, which are changed in accordance with the size of the display area 575 of the external electronic device 560, through the lens 555.

According to an embodiment of the present disclosure, the external electronic device 560 can provide, to a user, at least some areas of the contents 547 and 549 displayed in the second layout 545 of the electronic device 530 through the lens 555 through at least a partial area of the display area 575.

According to an embodiment of the present disclosure, the lens 555 may be formed to be adjacent to at least a part of, for example, the docking structure 570. For example, the external electronic device 560 can visually provide, to a user, contents displayed on a display of the electronic device 530 through the lens 555.

Figure 6:
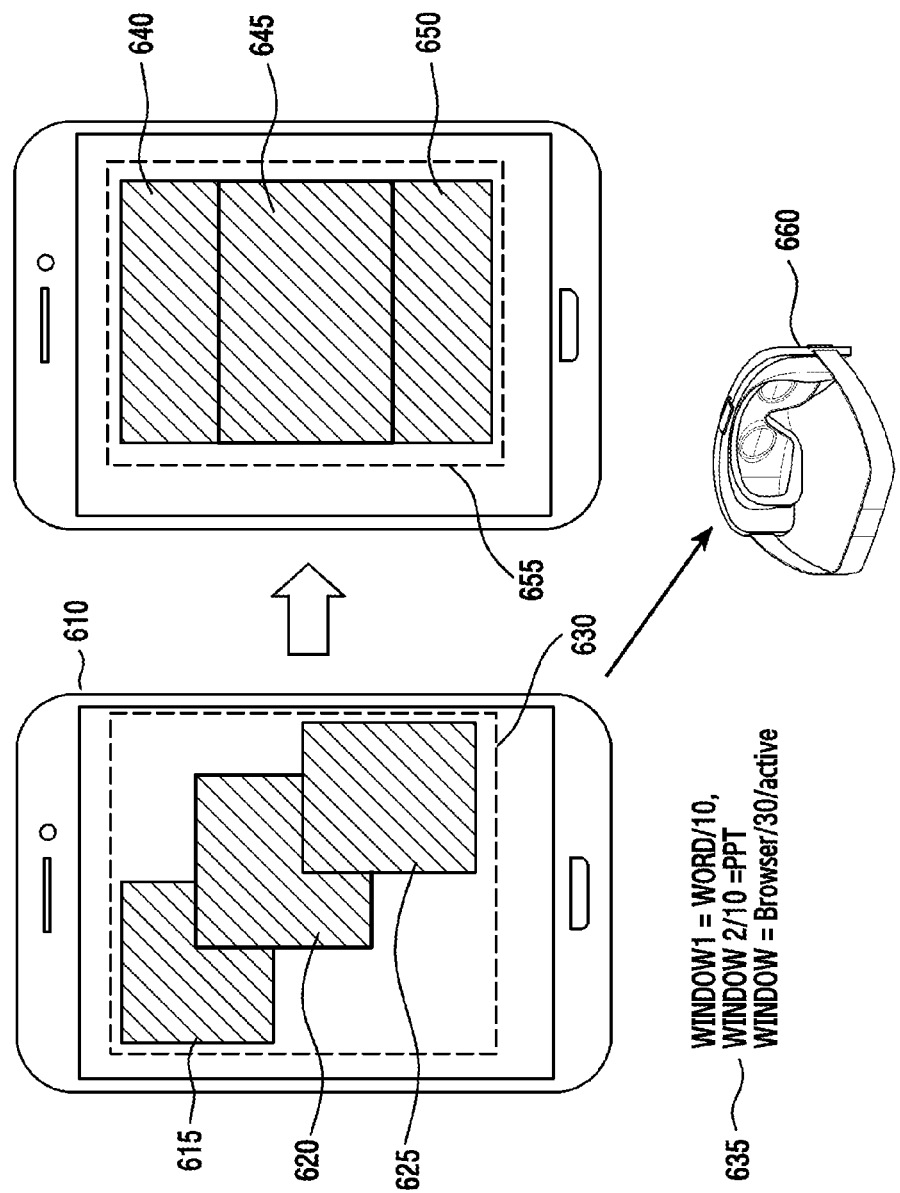
FIG. 6 illustrates an example layout change in an electronic device according to various embodiments of the present disclosure.

FIG. 6 illustrates an example layout change in an electronic device according to various embodiments.

According to an embodiment of the present disclosure, the electronic device can display contents in a layout form. For example, the layout may be a form presenting a size, a location, and a shape of at least one content.

According to an embodiment of the present disclosure, when at least one content is in a spiral form, the at least one content may be displayed in a layout of a spiral form. According to an embodiment of the present disclosure, the layout may present a virtual form indicating a configuration of a form (e.g., a spiral shape, a circular shape, and a rectilinear shape) which the at least one content constitutes.

Referring to FIG. 6, when the contents corresponds to a window, an electronic device 610 can, for example, display a first window 615, a second window 620, and a third window 625 in a form of a first layout 630. For example, the electronic device can display the at least one window in the first layout 630 in which at least a part of the at least one window overlaps at least a part of another window. For example, the electronic device can display windows in the first layout 630 in which at least a part of a first window 615 and at least a part of a second window 620 overlap each other or the at least a part of the second window 620 and at least a part of a third window 625 overlap each other. According to an embodiment of the present disclosure, the electronic device can activate at least one window displayed in the first layout 630. The activation is performed by, for example, user's selection or automatic selection of a system, and the electronic device can display the second window 620 in an attribute (e.g., a size, a color, and a shape) different from that of another window (e.g., the first window 615 and the third window 625).

According to an embodiment of the present disclosure, the electronic device 610 can change at least one content displayed on a display functionally connected to the electronic device 610, from the first layout 630 to a second layout 655, on the basis of a user's input or another information (e.g., connection with the external electronic device 660) and display the at least one content.

According to an embodiment of the present disclosure, the electronic device 610 can transfer, to the external electronic device 660, information 635 (e.g., a type of contents, a size of contents, activation information of contents, information of the first layout 630, information of the second layout 655, etc.) relating to contents displayed in the electronic device 610 to display the contents in the second layout 655 in the external electronic device 660. For example, the information 635 provided to the external electronic device 660 may include at least one of a size, a type (e.g., a document, a browser, a picture, an image, etc.), a color, or activation information (e.g., an activated window ID, an activated application ID, etc.) of contents (e.g., the first window 615, the second window 620, or the third window 625) displayed in the first layout 630.

According to an embodiment of the present disclosure, the electronic device 610 can simultaneously display at least a part of at least one of a plurality of windows displayed in the first layout 630, for example, the first window 615, the second window 620, and the third window 625. For example, the electronic device can change an attribute (e.g., a size, a color, a location, or a shape of a window) of at least one window among the first window 615, the second window 620, and the third window 625 and display the at least one window as at least one window among a fourth window 640, a fifth window 645, and a sixth window 650 in the second layout 655.

According to an embodiment of the present disclosure, the electronic device 610 can, for example, configure the second layout 655 on the basis of at least some pieces of the information 635 of the first layout 630.

According to an embodiment of the present disclosure, the electronic device can display contents in the second layout 655 in accordance with specific information (e.g., activation, a focus, selection, transparency, translucence, and movement) of contents displayed in the first layout 630. For example, the electronic device 610 can change at least a part of the second window 620 on the basis of activation information of the second window 620 that is activated in the first layout 630 and display the changed second window as the fifth window 645. At this time, the electronic device can activate (e.g., focus) and display the fifth window 645 obtained by changing the second window 620 to the second layout. The activation can change at least one of a size, a color, and a shape of the activated window differently from that of another window and display the activated window.

According to an embodiment of the present disclosure, the electronic device 610 can provide, to the external electronic device 660, information on the second layout 655 to be displayed through the external electronic device 660 on the basis of whether the electronic device 610 is connected to the external electronic device 660. For example, when detecting a physical connection (e.g., docking) or a communication connection (e.g., a wired connection, a wireless connection, etc.) between the electronic device 610 and the external electronic device 660, the electronic device 610 can change a form (e.g., a size, a color, a shape, etc.) of contents (e.g., a window) from the first layout 630 to the second layout 655 in accordance with the detection and provide the changed contents to the external electronic device 660. Otherwise, the electronic device 610 can provide information of contents displayed in the first layout 630, to the external electronic device 660, and the external electronic device 660 can change a layout of the contents from the first layout 630 to the second layout 655 through image processing and display the changed contents. For example, the external electronic device 660 can receive information 635 on contents or the first layout 630 from the electronic device 610 and identify at least one of, for example, a type, an activation state, and a size of the contents on the basis of the information 635. The external electronic device 660 can change at least one window from a state (e.g., the first layout) in which at least some parts of windows are displayed to overlap each other to a state (e.g., the second layout) in which at least some parts of windows are displayed not to overlap each other, and display the changed at least one window. For example, the electronic device 610 can display (provide) contents in the second layout 655 in which at least one of a size and a location of the contents are changed and formed to preclude overlap of at least a partial area of at least one content displayed in the first layout 630.

According to an embodiment of the present disclosure, the electronic device 610 can display contents in the second layout, through the external electronic device 660, on the basis of a size of an area (e.g., a visible area) which a user can view. For example, the electronic device display contents in the first layout 630, in which at least a part of the first window 615 is displayed to be hidden by or overlap at least a part of the second window 620, and at least a part of the second window 620 is displayed to be hidden by or overlap at least a part of the third window 625, in accordance with a size (e.g., 8 inch) of a display of the electronic device. The electronic device 610 can acquire an attribute (e.g., the size of a display, a brightness of the display, an illuminance or device information of the display, etc.) of the external electronic device 660. For example, the electronic device 610 can change a layout of contents from the first layout 630 to the second layout 655 on the basis of the attribute of the external electronic device 660. For example, the electronic device 610 can receive an attribute (e.g., a size, a resolution, a brightness, etc.) of the display of the external electronic device 660. For example, the electronic device can display the fourth window 640 obtained by changing at least one of a size and a location of the first window 615 in accordance with the attribute of the display.

The external electronic device 660 can, for example, provide, to a user, contents displayed in the second layout 655 in the electronic device 610 without separate image processing by the external electronic device 660. According to an embodiment of the present disclosure, the external electronic device 660 may include at least one lens. For example, a user can identify contents displayed in the second layout 655 in the electronic device 610, through the lens of the external electronic device 660.

According to an embodiment of the present disclosure, the external electronic device 660 can change contents displayed in the first layout in the electronic device 610 to the second layout on the basis of information (e.g., contents information, first layout information, and second layout information) received from the electronic device 610 and display the changed contents.

For example, the external electronic device 660 can change contents displayed in the first layout to the second layout through an image processor (e.g., a GPU) that is functionally connected to the external electronic device 660, on the basis of the information received from the electronic device 610.

For example, the external electronic device 660 can, for example, differently display an attribute of at least one content displayed in the first layout 630. For example, the electronic device can display the fifth widow 645 obtained by changing at least one of a brightness, a color, and a size of the activated second window 620 to be at least partially differently from another window. For example, the activated fifth window 645 can have a border to be thicker or a color of the outer line thereof is partially differently changed as compared with another window (e.g., the fourth window 640 or the sixth window 650).

Figure 7:
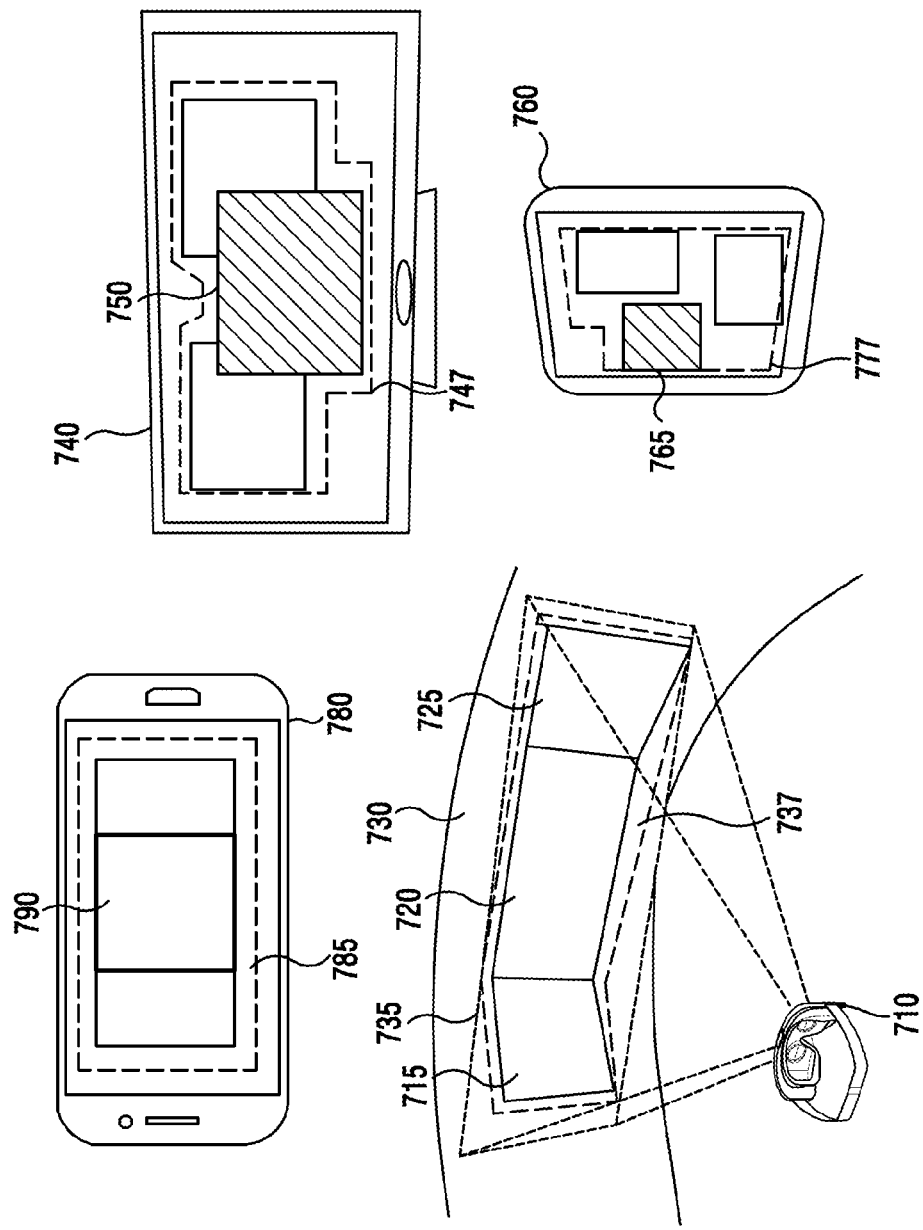
FIG. 7 illustrates an example layout change in an electronic device according to various embodiments of the present disclosure.

FIG. 7 illustrates an example layout change in an electronic device according to various embodiments of the present disclosure.

Referring to FIG. 7, according to an embodiment of the present disclosure, an electronic device 780 can change a layout of at least one content on the basis of types of external electronic devices, such as a TV 740, a tablet PC 760 and an HMD 710, that are connected thereto. For example, the electronic device can change a layout of contents from a first layout to a second layout and display the contents.

According to an embodiment of the present disclosure, the external electronic device may be an entertainment device such as the TV 740. In this case, the external electronic device (e.g., the TV 740) can change contents 790 displayed in a first layout 785 in the electronic device 780 to a second layout 747 and display the contents. For example, the television 740 can receive the contents 790 displayed in the first layout 785 in the electronic device 780 and display contents 750 having a second layout 747 on the basis of an attribute (e.g., a type (an LCD, a TFT, and an LED) and a size of a display) of the TV 740. For example, when a resolution or a size of a display of the TV 740 is larger than that of the electronic device 780, the contents 750 can be changed to the contents having a size larger than that of the contents 790 having the first layout 785 in accordance with the size or the resolution of the display of the TV 740.

According to an embodiment of the present disclosure, the external electronic device may be a portable computing device such as the tablet PC 760. When the external electronic device is the tablet PC 760, the tablet PC 760 can receive the contents 790 having the first layout 785 from the electronic device 780, change the received contents to contents 765 having a third layout 777 on the basis of an attribute (e.g., a size, a resolution, etc. of a display) of a display of the tablet PC, and display the contents 765.

According to an embodiment of the present disclosure, when the plurality of external electronic devices 740, 760, and 710 are connected to the electronic device 780, the electronic device 780 can sequentially or simultaneously display the contents displayed in the first layout 785 in at least one of the second layout 747 and the third layout 777. For example, the electronic device 780 can display the third layout 777 to the tablet PC 760 and display the second layout 747 to the television 740.

For example, the tablet PC 760 can change an attribute (e.g., a location, a size, or a color) of the contents 765 having the third layout 777 on the basis of a user's input (e.g., a touch and a hovering) detected through a sensor (e.g., a touch sensor) that is functionally connected to the tablet PC 760. For example, when a user performs a touch gesture (e.g., a swipe in which a touch moves from a left side to a right side), the tablet PC 760 can recognize the corresponding gesture through a sensor (e.g., a touch sensor), change a size or a location of the contents 765 of the third layout 777 in response to the recognized gesture, and display the contents 765 in another layout (not illustrated) which is moved from the left side to the right side. According to an embodiment of the present disclosure, the second layout 747 or the third layout 777 provided from the electronic device (e.g., the HMD 710, the TV 740, and the tablet PC 760) can be shared or transferred between the electronic devices on the basis of wired or wireless communication.

According to an embodiment of the present disclosure, the external electronic device may be an HMD 710. In this case, the HMD 710 can receive, from the electronic device 780, information (e.g., a content type, a content ID, an activation content, a content size, etc.) on at least one content 790 displayed in the first layout 785 in the electronic device 780. For example, the HMD 710 can change an attribute (e.g., a size, a color, a location, or the like) of at least one content among the contents 790 displayed in the first layout 785 to the second layout 747 in accordance with a predetermined area 735 of a display 730 of the HMD 710 and display contents 715, 720, and 725. According to an embodiment of the present disclosure, the HMD 710 can change and display the contents 790 activated in the first layout 785 to the contents activated in the second layout 747.

According to an embodiment of the present disclosure, when the external electronic device is an HMD, a user can view contents through at least a partial area 735 within the display area 730 of the HMD 710. According to an embodiment of the present disclosure, the display area 730 may be a virtual area recognized (e.g. shown) by a user through at least a partial component (e.g., a lens) of the HMD 710 or an area projected to the outside of the HMD 710.

The HMD 710 can detect at least one of movement, a sightline, and a gesture of a user through a sensor (e.g., a gesture sensor, a velocity sensor, a geomagnetic sensor, etc.) that is functionally connected to the HMD 710. The HMD 710 can display contents through the at least a partial area 735 of the display area 730 in accordance with the detection. For example, when a user moves his/her head left or right, the HMD 710 can detect movement of the head of the user, and move a location of the contents displayed in the at least a partial area 735 of the display area 730 left or right or display the contents with a different size.

Figure 8:
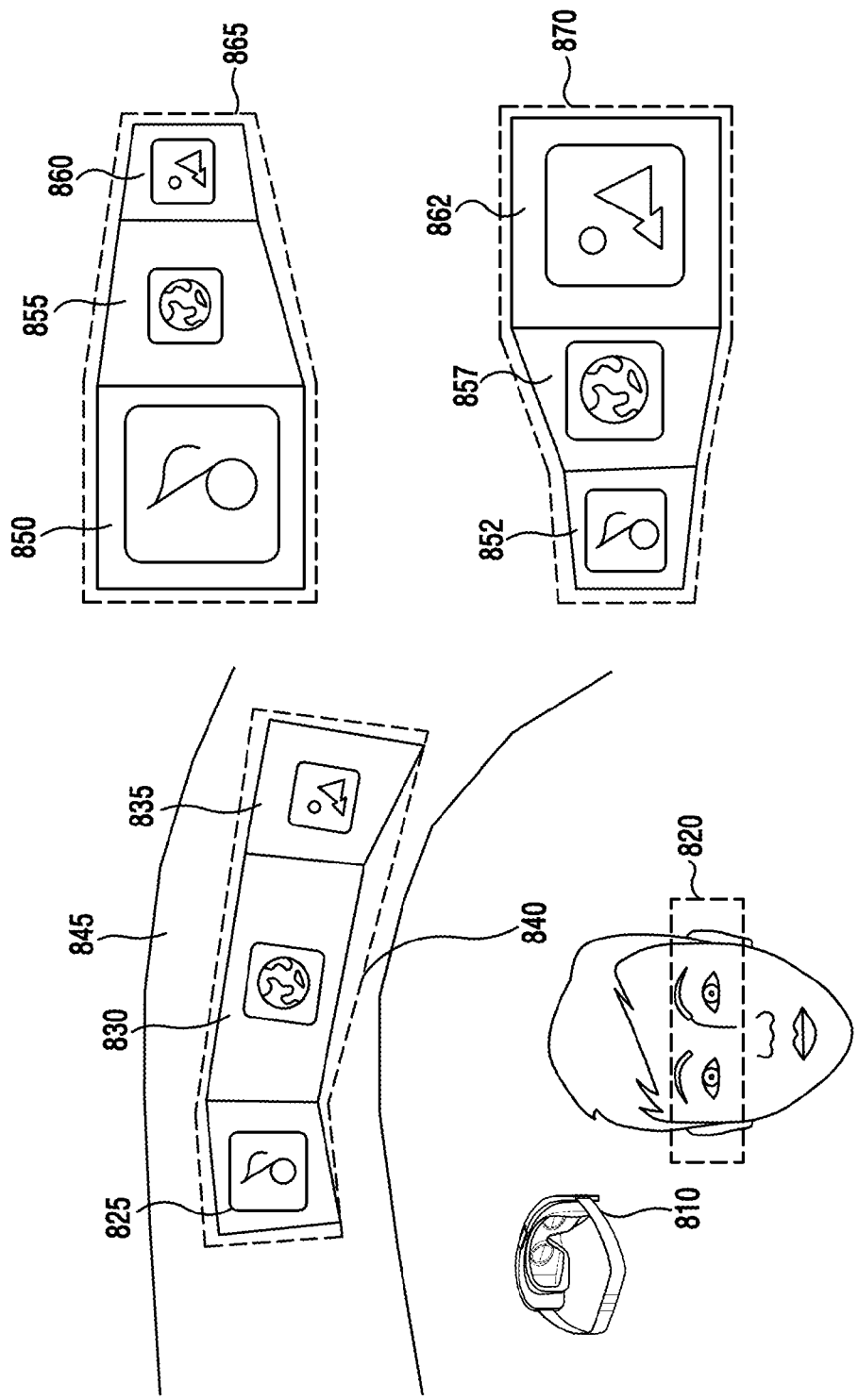
FIG. 8 illustrates an example layout change in response to a user's movement in an electronic device according to various embodiments of the present disclosure.

FIG. 8 illustrates an example layout change in response to a user's movement by an electronic device according to various embodiments of the present disclosure.

Referring to FIG. 8, according to an embodiment of the present disclosure, the electronic device may be an HMD 810. According to an embodiment of the present disclosure, the HMD 810 can change a layout of contents from a first layout 840 to at least one of a second layout 865 and a third layout 870 on the basis of movement, a sightline, or a gesture of a user. For example, the HMD 810 can recognize a gesture (e.g., a touch, a hovering, a head motion, or a hand motion) of a user on the basis of a sensor (e.g. a gesture sensor (e.g., reference numeral 240A in FIG. 2), a touch sensor (e.g., reference numeral 252 in FIG. 2), an acceleration sensor (e.g., reference numeral 240E in FIG. 2), a tilt sensor (not illustrated), a camera module (e.g., reference numeral 291 in FIG. 2), a GPS module (e.g., reference numeral 227 in FIG. 2), or the like) that is functionally connected to the HMD 810

According to an embodiment of the present disclosure, the HMD 810 may include a sightline recognition sensor (not illustrated) which can recognize a sightline (e.g. a direction of a sightline, movement of a sightline, movement of an eyeball, etc.) of a user. For example, the HMD 810 can detect a sightline 820 of a user through the sightline recognition sensor (not illustrated) that is functionally connected to the HMD 810. For example, when a user moves his/her eyes from a left side to a right side, the HMD 810 can recognize a corresponding gesture through a sensor (e.g., the sightline recognition sensor, an IR sensor, a UV ray sensor, a camera, etc.), change at least one of a size and a location of contents 825, 830 and 835 having a first layout 840 to that of contents 850, 855, and 860 having a second layout 865 in response to the recognized gesture, and display the contents 825, 830 and 835. For example, when a sightline or a head of a user moves in a first direction (e.g., from a right side to a left side), the HMD 810 can change the contents 825 to the contents 850 corresponding to the second layout 865 by increasing the size of the contents 825 at a right side with regard to the first layout 840. For example, the HMD 810 can change the contents displayed in the first layout 840 to the contents displayed in the second layout 865 configured such that the size of the contents 850 located on a right side is displayed larger and display the changed contents. The HMD 810 can, for example, change the sizes of the contents 855 and 860 in accordance with a change in the size of the changed contents 850.

According to an embodiment of the present disclosure, when at least one of a sightline and a head of a user moves in a second direction (e.g., from a left side to a right side), the HMD 810 can change a layout of contents in accordance with the second direction. For example, the HMD 810 can detect movement (e.g., the second direction) of a head of a user and change the size of contents 862 on the rightmost side to be larger than that of other contents 852 and 857 in accordance with the detection. For example, the HMD 810 can, for example, change the contents 835 to the contents 862 corresponding to the third layout 870 by increasing the size of the contents 835 on the left side of the first layout 840 in accordance with the second direction. For example, the HMD 810 can change the contents 825, 830, and 835 displayed in the first layout 840 to the contents 852, 857 and 862 having a third layout 870 which are configured such that the contents 862 located at the left side is displayed larger, in accordance with the movement, and display the changed contents, respectively.

According to an embodiment of the present disclosure, an electronic device may include a contents provision module (e.g., reference numeral 180 in FIG. 1), and the contents provision module can display contents in a first layout, identify a connection between the electronic device and an external electronic device, and provide the contents to the external electronic device such that the contents is displayed in a second layout on the basis of the identification.

According to an embodiment of the present disclosure, the external electronic device may include a wearable device, and in the operation of identifying, a contact between the electronic device and the wearable device can be detected.

According to an embodiment of the present disclosure, the contents provision module can change a layout of the contents from the first layout to the second layout in the electronic device.

According to an embodiment of the present disclosure, the contents provision module can change at least one of a location, a shape, the number, a color, and an activation state of at least a part of the contents.

According to an embodiment of the present disclosure, the contents provision module can include the contents in a first window and a second window, and maintain an activation state of at least one of the first window and the second window.

According to an embodiment of the present disclosure, the contents provision module can determine the second layout at least on the basis of at least one of a curvature and a viewing angle of a display of the external electronic device.

According to an embodiment of the present disclosure, the contents provision module can identify a connection between the electronic device and another external electronic device, and change a layout of the contents from the first layout to a third layout on the basis of the identification of the connection with the external electronic device.

According to an embodiment of the present disclosure, the contents provision module can identify a connection between the electronic device and another external electronic device, and sequentially or simultaneously change the contents to at least one of the second layout and the third layout on the basis of the identification when the electronic device is connected to at least one other electronic device.

According to an embodiment of the present disclosure, the contents provision module can change the contents to the second layout in the at least one external electronic device.

According to an embodiment of the present disclosure, the contents provision module can change the contents to the third layout on the basis of an input for the contents displayed in the second layout through the external electronic device, in the electronic device.

According to an embodiment of the present disclosure, an electronic device may include a display for displaying contents and a contents provision module, and the contents provision module can be configured to display the contents in a first layout through the display, identify a connection between the electronic device and an external electronic device, and provide the contents to the external electronic device to display the contents in a second layout on the basis of the identification.

According to an embodiment of the present disclosure, the electronic device or at least a part of the one or more electronic devices may be worn on or attached to a part of a body of a user.

According to an embodiment of the present disclosure, the contents provision module can be configured to change a layout of the contents from the first layout to the second layout in the electronic device on the basis of an attribute of the external electronic device.

According to an embodiment of the present disclosure, the contents provision module can be configured to change a layout of the contents from the first layout to the second layout on the basis of at least one of movement, a sightline, and a gesture of a user.

According to an embodiment of the present disclosure, the contents provision module can be configured to change at least one of a location, a shape, the number, a color, and an activation state of at least a part of the contents.

According to an embodiment of the present disclosure, the external electronic device may include a wearable device, and can be configured to detect a contact between the electronic device and the wearable device.

According to an embodiment of the present disclosure, the contents provision module can be configured to change the contents to at least one layout among the second layout and the third layout on the basis of at least one of a touch input, a gesture, and a voice input of a user.

According to an embodiment of the present disclosure, the contents provision module can be configured to display activated contents in at least a part of the second layout on the basis of activated contents in the first layout.

According to an embodiment of the present disclosure, an electronic device may include a display, and a contents provision module, and the contents provision module can be configured to receive contents which have been displayed in a first layout in an external electronic device, and output the contents in a second layout through the display.

According to an embodiment of the present disclosure, the electronic device may include an HMD.

According to an embodiment of the present disclosure, the HMD may include at least one sensor which can receive a touch input, a gesture input, or a voice input for the contents.

According to an embodiment of the present disclosure, the contents provision module can be configured to transmit at least a part of the contents to another external electronic device functionally connected to the electronic device.

According to an embodiment of the present disclosure, the contents may a first window and a second window, and the contents provision module can be configured to maintain an activation state of at least one of the first window and the second window and provide the contents in the second layout.

According to an embodiment of the present disclosure, the contents provision module can identify a connection between the electronic device and another external electronic device, and change a layout of the contents from the first layout to a third layout on the basis of the identification.

Figure 9:
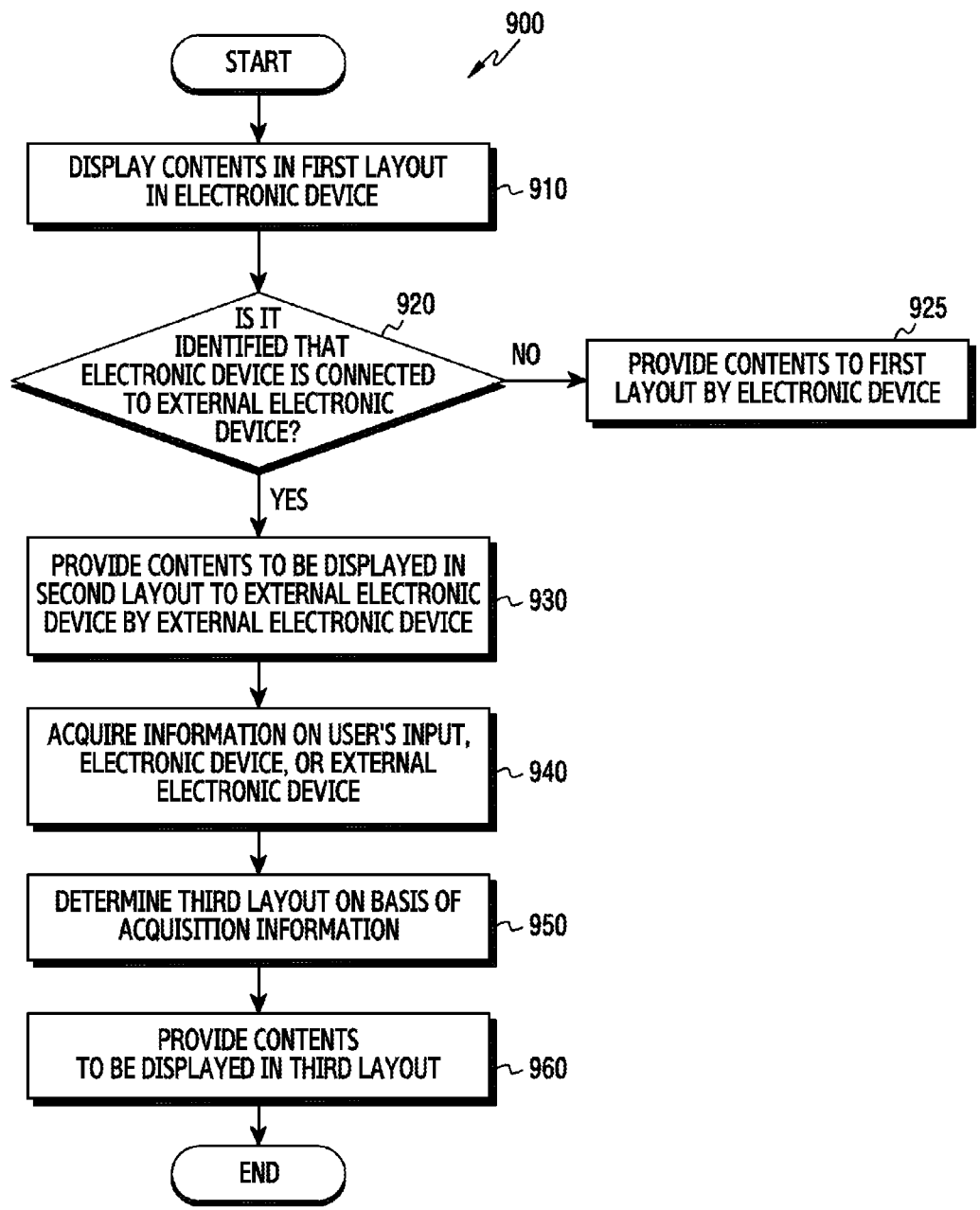
FIG. 9 is a flowchart of a method for providing contents to an external electronic device according to various embodiments of the present disclosure.

FIG. 9 is a flowchart of a method for providing contents to an external electronic device according to various embodiments of the present disclosure.

Referring to FIG. 9, a method 900 of an electronic device (e.g., the electronic device 101) is provided. The electronic device can identify a connection (e.g., a docking connection, a wired connection, or a wireless connection) with an external electronic device, and provide contents to be displayed in the external electronic device, in accordance with the connection.

In operation 910, the electronic device can display contents (e.g., a picture, an image, a photograph, a window, an application, a document, a web browser, or a messenger) in a first layout through a display functionally connected to the electronic device. According to an embodiment of the present disclosure, the first layout may include a plurality of contents that overlap each other or are covered. For example, operation 910 can be performed through a display module (e.g., the display module 440) of the electronic device.

In operation 920, the electronic device can, for example, identify a connection between the electronic device and the external electronic device.

According to an embodiment of the present disclosure, the electronic device can be connected to the external electronic device through wireless communication or wired communication. The wireless communication may include at least one of, for example, Wi-Fi, BT, NFC, and cellular communication. The wired communication may include at least one of, for example, a USB and a HDMI.

According to an embodiment of the present disclosure, the electronic device can be coupled and connected to the external electronic device while being disposed within the external electronic device. For example, when the external electronic device is an HMD, the electronic device can be fastened to a predetermined part of the external electronic device to display contents to a user. According to an embodiment of the present disclosure, the electronic device can determine whether the electronic device is coupled to a predetermined part of the external electronic device, on the basis of a sensor (e.g., a magnetic field sensor, a touch sensor, an IR sensor, or a magnet sensor) that is functionally connected to the electronic device.

For example, operation 920 can be performed through an identification module (e.g., the identification module 430) of the electronic device.

In operation 925, the electronic device can display the contents in a first layout when the electronic device is not connected to the external electronic device.

For example, operation 925 can be performed through a display module (e.g., the display module 440) of the electronic device.

In operation 930, the electronic device can provide contents to be displayed in a form of a second layout to the external electronic device in the external electronic device if it is determined that the electronic device is connected with the external electronic device in operation 920.

According to an embodiment of the present disclosure, when it has been identified that the electronic device and the external electronic device are connected to each other, the electronic device can change the contents, which has been displayed in the first layout, to the second layout or provide information (e.g., a size, a location, activation information, or a type) on the contents to be displayed in the second layout in the external electronic device, to the external electronic device.

For example, operation 930 can be performed through a provision module (e.g., the provision module 450) of the electronic device.

In operation 940, the electronic device or the external electronic device can acquire a user's input and information on the electronic device or the external electronic device. According to an embodiment of the present disclosure, the electronic device can acquire at least one piece of information among a user's input (e.g., a touch, a gesture, or a hovering), information (e.g., a display size, a display resolution, or movement) on the electronic device, and information (e.g., a display size, a display resolution, or movement) on the external electronic device on the basis of a sensor (e.g., a touch sensor, an IR sensor, or a camera sensor) functionally connected to the electronic device or the external electronic device. According to an embodiment of the present disclosure, the external electronic device can recognize a user's gesture through a sensor (e.g., a camera sensor or a touch sensor) that is functionally connected to the external electronic device, and provide the recognized gesture information to the electronic device. According to an embodiment of the present disclosure, when the external electronic device is an HMD, the external electronic device can detect movement of a head of a user on the basis of a sensor (e.g., a position sensor, a magnetic sensor, an acceleration sensor, etc.) that is functionally connected to the external electronic device, and provide the detected movement information to the electronic device. The electronic device can acquire information on a user's gesture acquired through a plurality of external electronic devices that are functionally connected to the electronic device, from the plurality of external electronic device. According to an embodiment of the present disclosure, the electronic device can acquire position information of the electronic device or the external electronic device, using a sensor (e.g., a 6 axis sensor, an acceleration sensor, etc.) that is functionally connected to the electronic device or the external electronic device. The electronic device can, for example, calculate a horizontal angle or a vertical angle of the electronic device or the external electronic device through the information acquired through the sensor, and identify user movement of the electronic device or the external electronic device.

For example, operation 940 can be performed through an identification module (e.g., the identification module 430) of the electronic device.

In operation 950, a third layout can be determined on the basis of the information acquired in operation 940. The electronic device can, for example, determine an attribute (e.g., a location, a size, a color, an activation state, etc.) of the contents displayed in the second layout, on the basis of a user's input (e.g., a touch, a hovering, a gesture, a voice, etc.) acquired through a sensor that is functionally connected to the electronic device and information (e.g., a position, a user's gesture, etc.) on the electronic device or the external electronic device. According to an embodiment of the present disclosure, the electronic device can determine an attribute (e.g., a location, a size, a color, an activation state, etc.) of the contents displayed in the second layout, on the basis of an automatic input (e.g., situation recognition, an application type, a user's input pattern (e.g., a left hander or a right hander), a user's body structure, or the like) by a system and a specific user's input such as a specific gesture.

According to an embodiment of the present disclosure, when the electronic device is connected to the external electronic device (e.g., an HMD) by coupling (e.g., docking), the external electronic device can recognize a user's gesture through a sensor that is functionally connected to the external electronic device and transfer the recognized gesture to the electronic device. The electronic device can determine a movement location of the contents displayed in the second layout, on the basis of the user's gesture. For example, when the user's gesture is measured to be larger than a predetermined criterion, the electronic device can determine that a change in a location of the contents is larger than the predetermined criterion.

According to an embodiment of the present disclosure, activation (e.g., an ON state or a wakeup state) or deactivation (e.g., an OFF state or a deep sleep state) of a display of the electronic device or the external electronic device can be determined on the basis of the information acquired in operation 940. For example, when a user requests deactivation of the display through a specific gesture, electronic device can recognize the specific gesture and make a determination to deactivate a display corresponding to the gesture in accordance with the recognition.

For example, operation 950 can be performed through a determination module (e.g., the determination module 420) of the electronic device.

In operation 960, the electronic device can provide contents to be displayed in the third layout, on the basis of the determination of operation 950. According to an embodiment of the present disclosure, when the external electronic device can perform layout change processing, the electronic device can provide information (e.g., a location, a size, and an activation state of the contents) required to display the contents in the third layout, to the external electronic device. For example, the external electronic device can change a layout of the contents from at least one layout among the first layout and the second layout to the third layout on the basis of the information received from the electronic device, and provide the contents corresponding to the third layout to a user. According to an embodiment of the present disclosure, when the external electronic device cannot perform the layout change processing, the electronic device can change a layout of the contents from at least one layout among the first layout and the second layout to the third layout and display the contents in the third layout. For example, the external electronic device can provide the third layout displayed in the electronic device to a user through a lens included in the external electronic device.

For example, operation 960 can be performed through a provision module (e.g., the provision module 450) of the electronic device.

Figure 10:
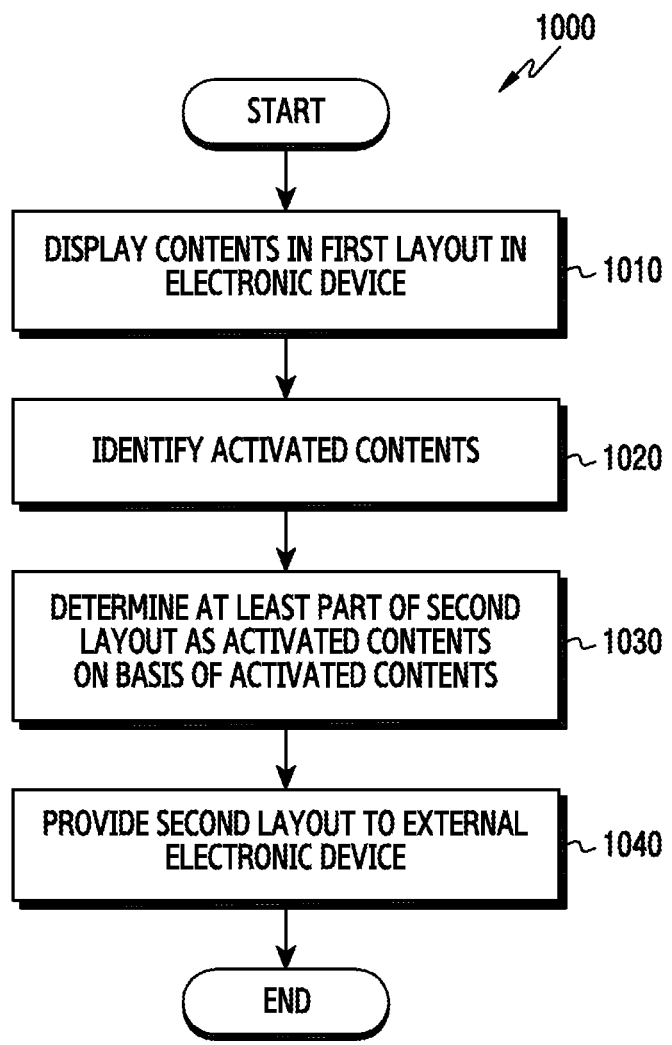
FIG. 10 is a flowchart of a method for providing a layout based on activated contents in an electronic device according to various embodiments of the present disclosure.

FIG. 10 is a flowchart of a method for providing a layout based on activated contents in an electronic device according to various embodiments of the present disclosure.

Referring to FIG. 10, a method 1000 for providing a layout based activated contents is illustrated. According to an embodiment of the present disclosure, an electronic device or an external electronic device can acquire activation information of contents displayed in a form of a first layout. For example, when the contents correspond to a window, at least one window among a plurality of windows can be activated on the basis of user's selection or selection by a system. The activated window can be displayed such that at least one of a color, a size, and a location thereof is different from that of another window. For example, the electronic device can display at least one activated window among a plurality of windows in a state in which a border is thicker than that of another window or a color thereof is different from that of another window. According to an embodiment of the present disclosure, the electronic device can display the activated window in a state in which the size thereof is larger than that of another window. According to an embodiment of the present disclosure, at least one content included in the first window can be divided and provided through the display of the electronic device or the external electronic device on the basis of configuration information (e.g., a display area division configuration) of the electronic device. For example, when a user makes a configuration to divide a display area, first contents included in a first window is displayed through the electronic device, and second contents included in the first window can be displayed through the external electronic device. For example, the electronic device or the external electronic device can change the first contents or the second contents to the second contents or third contents by changing an attribute (e.g., a size, a color, or a location) of the contents on the basis of a type of the electronic device or the external electronic device and display the changed contents in the second layout.

According to an embodiment of the present disclosure, when a plurality of external electronic devices are connected to the electronic device, the electronic device or the external electronic devices can change at least some contents among the contents and simultaneously provide the changed contents to other devices among the plurality of external electronic devices.

In operation 1010, a display module (e.g. the display module 440 of FIG. 4) of the electronic device can display contents in a first layout through a display that is functionally connected to the electronic device.

For example, operation 1010 can be performed through a display module (e.g., the display module 440) of the electronic device.

In operation 1020, the electronic device can identify at least one activated content included in the first layout. The electronic device can identify information among a type, a size, a location, and a size of the activated contents.

For example, operation 1020 can be performed through an identification module (e.g., the identification module 430) of the electronic device.

In operation 1030, the electronic device can determine contents in the second layout as activated contents on the basis of the identification. For example, the electronic device can determine at least one content among a plurality of contents included in the second layout as activated contents on the basis of information of at least one activated content among a plurality of contents included in the first layout.

For example, operation 1030 can be performed through a determination module (e.g., the determination module 420) of the electronic device.

In operation 1040, the electronic device can provide the second layout including the activated contents to the external electronic device. For example, the electronic device can change a color, a size and a location of the activated contents included in the second layout to distinguish the activated contents from deactivated contents. For example, the electronic device can provide information on the changed contents to the external electronic device. According to an embodiment of the present disclosure, the changed contents included in the second layout may include contents obtained by enlarging, reducing, moving, or rotating the activated contents included in the first layout.

For example, operation 1040 can be performed through the provision module 450 of the electronic device.

According to an embodiment of the present disclosure, a method may include displaying contents in a first layout in an electronic device, identifying a connection between the electronic device and an external electronic device, and providing the contents to the external electronic device on the basis of the identification, wherein the contents can be displayed in a second layout in the external electronic device.

According to an embodiment of the present disclosure, the external electronic device may include a wearable device, and the identifying may include detecting a contact between the electronic device and the wearable device.

According to an embodiment of the present disclosure, the providing may include changing a layout of the contents from the first layout to the second layout in the electronic device.

According to an embodiment of the present disclosure, the changing may include changing at least one of a location, a shape, the number, a color, and an activation state of at least a part of the contents.

According to an embodiment of the present disclosure, the contents may include a first window and a second window, and the changing may include maintaining an activation state of at least one of the first window and the second window.

According to an embodiment of the present disclosure, the changing may include determining the second layout at least on the basis of at least one of a curvature and a viewing angle of a display of the external electronic device.

According to an embodiment of the present disclosure, a method may include identifying a connection between the electronic device and another external electronic device, and changing the contents from the first layout to a third layout on the basis of the identification of the connection with the external electronic device.

According to an embodiment of the present disclosure, a method may further include identifying a connection between the electronic device and another external electronic device, and sequentially or simultaneously changing a layout of the contents from the first layout to at least one of the second layout and the third layout on the basis of the identification of the connection with the external electronic device when the electronic device is connected to at least one other electronic device.

According to an embodiment of the present disclosure, the method may include changing a layout of the contents to the second layout in the at least one external electronic device.

According to an embodiment of the present disclosure, the method may further include changing a layout of the contents to the third layout on the basis of an input for the contents displayed in the second layout through the external electronic device, in the electronic device.

According to an embodiment of the present disclosure, the displaying of the contents may include displaying the contents in the first layout through the display, identifying a connection between the electronic device and the external electronic device, changing a layout of the contents to the second layout on the basis of the identifying, and providing the changed contents to the external electronic device.

According to an embodiment of the present disclosure, the method may include wearing or attaching the electronic device or at least some of the one or more electronic devices on or to a user.

According to an embodiment of the present disclosure, the method may include changing a layout of the contents from the first layout to the second layout on the basis of an attribute of the external electronic device.

According to an embodiment of the present disclosure, the method may include changing a layout of the contents from the first layout to the second layout on the basis of at least one of movement, a sightline, and a gesture of a user.

According to an embodiment of the present disclosure, the method may include changing at least one of a location, a shape, the number, a color, and an activation state of at least some of the contents.

According to an embodiment of the present disclosure, the external electronic device may include a wearable device, and the method may include detecting a contact between the electronic device and the wearable device.

According to an embodiment of the present disclosure, the method may include changing a layout of the contents to at least one layout among the second layout and the third layout on the basis of at least one of a touch input, a gesture, and a voice input of a user.

According to an embodiment of the present disclosure, the method may include displaying activated contents in at least a part of the second layout on the basis of activated contents in the first layout.

According to an embodiment of the present disclosure, the method may include receiving contents which has been displayed in the first layout in the external electronic device, and providing the contents to the second layout through the display.

According to an embodiment of the present disclosure, the electronic device may include an HMD.

According to an embodiment of the present disclosure, the HMD can receive a touch input, a gesture input, a voice input for the contents.

According to an embodiment of the present disclosure, the method may include transmitting at least some of the contents to another external electronic device functionally connected to the electronic device.

According to an embodiment of the present disclosure, the method may include maintaining an activation state of at least one of the first window and the second window and providing the at least one of the first window and the second window to the second layout.

According to an embodiment of the present disclosure, the method may include identifying a connection between the electronic device and another external electronic device, and changing a layout of the contents from the first layout to a third layout on the basis of the identification of the connection with the external electronic device.

According to various embodiments of the present disclosure, at least a part of a device (for example, modules or functions thereof) or a method (for example, operations) according to the various embodiments of the present disclosure may be embodied by, for example, a command stored in a computer readable storage medium in a form of a programming module. When the command is executed by one or more processors (for example, the processor 120), the one or more processors may execute a function corresponding to the command. The computer-readable storage medium may be stored in, for example, the memory 130. At least a part of the programming module may, for example, be implemented (e.g., executed) by the processor 120. At least a part of the programming module may, for example, include a module, a program, a routine, a set of instructions, or a process for performing at least one function.

The computer readable recording medium may include magnetic media such as a hard disc, a floptical disc, and a magnetic tape, optical media such as a CD-ROM and a DVD, magneto-optical media such as a floptical disc, and hardware devices specifically configured to store and execute program commands, such as a ROM, a RAM, and a flash memory. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. According to various embodiments of the present disclosure, a storing medium having instructions stored therein, the instructions being configured to allow at least one processor to perform at least one operation when being executed by the at least one processor, is provided. The at least one operation may include displaying contents in a first layout in an electronic device, identifying a connection between the electronic device and an external electronic device, and providing to the contents to the external electronic device to display the contents in a second layout in the external electronic device on the basis of the identifying.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating an electronic device, the method comprising:
    displaying, by the electronic device, a plurality of windows in a first layout, wherein at least a portion of the plurality of windows overlap each other in the first layout;
    identifying, by the electronic device, a connection with a first external electronic device; and
    displaying, by the electronic device, the plurality of windows in a second layout through the first external electronic device,
    wherein the displaying of the plurality of windows in the second layout comprises changing at least one attribute of at least one window from among the plurality of windows such that at least a portion of the plurality of windows do not overlap each other in the second layout,
    wherein the plurality of windows comprises one first window activated currently and at least one second window deactivated currently,
    wherein, in the second layout, the first window is displayed differently from the at least one second window in terms of at least one of a size, a color, or a form.

2. The method of claim 1,
    wherein the displaying of the plurality of windows in the second layout comprises changing the plurality of windows from the first layout to the second layout based on an attribute of the first external electronic device, and
    wherein the attribute of the first external electronic device comprises at least one of a size, or an illuminance of a display functionally connected to the first external electronic device.

3. The method of claim 2, wherein the changing of the plurality of windows comprises:
    changing at least one of a number, a color, or an activation state, of a portion of the plurality of windows.

4. The method of claim 1,
    wherein the displaying of the plurality of windows in the second layout comprises maintaining an activation state of the first window.

5. The method of claim 1, wherein the second layout is determined based on one of a curvature of a display of the first external electronic device and a size of a viewing area of the first external electronic device.

6. The method of claim 1, wherein the attribute comprises at least one of a size, a location, or a shape.

7. The method of claim 1,
    wherein the first external electronic device comprises a left lens and a right lens, and
    wherein the displaying of the plurality of windows comprises:
        displaying the plurality of windows on a display of the electronic device in which a part of the plurality of windows is displayed on a left area of the display corresponding to the left lens of the first external electronic device and another part of the plurality of windows is displayed on a right area of the display corresponding to the rig ht lens of the first external electronic device.

8. The method of claim 1, wherein the first external electronic device is configured to change the plurality of windows from the first layout to the second layout.

9. The method of claim 1, further comprising changing the plurality of windows to a third layout by the electronic device based on an input received through the first external electronic device.

10. An electronic device comprising:
    a display configured to display content;
    at least one processor; and
    at least one memory storing one or more computer programs, including instructions configured to be executed by the at least one processor, wherein the one or more computer programs include instructions to at least:
        display at least one of a plurality of windows in a first layout through the display, wherein at least a portion of the plurality of windows overlap each other in the first layout,
        identify a connection with a first external electronic device, and
        display the plurality of windows in a second layout through the first external electronic device,
    wherein the displaying of the plurality of windows in the second layout comprises changing at least one attribute of at least one window from among the plurality of windows such that at least a portion of the plurality of windows do not overlap each other in the second layout,
    wherein the plurality of windows comprises one first window activated currently and at least one second window deactivated currently,
    wherein, in the second layout, the first window is displayed differently from the at least one second window in terms of at least one of a size, a color, or a form.

11. The electronic device of claim 10,
    wherein the one or more computer programs further include instructions to at least change the plurality of windows from the first layout to the second layout based on an attribute of the first external electronic device, and
    wherein the attribute of the first external electronic device comprises at least one of a size, or an illuminance of a display functionally connected to the first external electronic device.

12. The electronic device of claim 10, wherein the one or more computer programs further include instructions to at least change the plurality of windows from the first layout to the second layout based on a sightline of a user.

13. The electronic device of claim 10, wherein the one or more computer programs further include instructions to at least change at least one of a number, a color, or an activation state, of the plurality of windows.

14. The electronic device of claim 10, wherein the one or more computer programs include instructions to at least:
    maintain an activation state of the first window when changing the plurality of windows from the first layout to the second layout.

15. The electronic device of claim 10, wherein the second layout is determined based on one of a curvature and a size of a viewing area of the first external electronic device.

16. The electronic device of claim 10, wherein the one or more computer programs further include instructions to at least display a portion of the second layout, using activated content of the first layout based on the activated content.

17. The electronic device of claim 10,
wherein the first external electronic device comprises a left lens and a right lens, and
wherein the one or more computer programs include instructions to at least:
display the plurality of windows on a display of the electronic device in which a part of the plurality of windows is displayed on a left area of the display corresponding to the left lens of the first external electronic device and another part of the plurality of windows is displayed on a right area of the display corresponding to the right lens of the first external electronic device.

18. A non-transitory computer-readable recording medium having instructions stored therein, wherein the instructions are configured to perform a method by at least one processor when executed by the at least one processor, the method comprising:

displaying, by an electronic device, at least one of a plurality of windows in a first layout in the electronic device, wherein at least a portion of the plurality of windows overlap each other in the first layout; and identifying, by the electronic device, a connection with a first external electronic device; and displaying, by the electronic device, the plurality of windows in a second layout through the first external electronic device, wherein the displaying of the plurality of windows in the second layout comprises changing at least one attribute of at least one window from among the plurality of windows such that at least a portion of the plurality of windows do not overlap each other in the second layout, wherein the plurality of windows comprises one first window activated currently and at least one second window deactivated currently, wherein, in the second layout, the first window is displayed differently from the at least one second window in terms of at least one of a size, a color, or a form.

\* \* \* \* \*